US012646020B2

(12) United States Patent
Jacobs et al.

(10) Patent No.: US 12,646,020 B2
(45) Date of Patent: Jun. 2, 2026

(54) APPARATUS FOR CLASSROOM SCHEDULING AND METHOD OF USE

(71) Applicant: Anytime Movement, LLC, Nashua, NH (US)

(72) Inventors: James L. Jacobs, Nashua, NH (US); Jonas Amberger, Eliot, ME (US)

( * ) Notice: Subject to any disclaimer, the term of this patent is extended or adjusted under 35 U.S.C. 154(b) by 160 days.

(21) Appl. No.: 18/368,915

(22) Filed: Sep. 15, 2023

(65) Prior Publication Data

US 2025/0094890 A1     Mar. 20, 2025

(51) Int. Cl.
  *G06Q 10/0631*     (2023.01)
  *G06F 9/451*     (2018.01)
(52) U.S. Cl.
  CPC ....... *G06Q 10/06311* (2013.01); *G06F 9/451* (2018.02)
(58) Field of Classification Search
  None
  See application file for complete search history.

(56) References Cited

U.S. PATENT DOCUMENTS

| 4,762,350 | A | * | 8/1988 | Hurtado | E05C 19/003 |
| | | | | | 292/259 R |
| 11,010,677 | B2 | | 5/2021 | Terra | |
| 2002/0029349 | A1 | * | 3/2002 | Daigneault | G07C 9/27 |
| | | | | | 726/26 |
| 2002/0178385 | A1 | * | 11/2002 | Dent | H04L 9/3271 |
| | | | | | 726/27 |
| 2003/0005336 | A1 | * | 1/2003 | Poo | G06F 21/34 |
| | | | | | 726/5 |
| 2004/0059617 | A1 | * | 3/2004 | McGovern | G06Q 10/1093 |
| | | | | | 705/7.18 |
| 2007/0099166 | A1 | * | 5/2007 | Moesges | G09B 5/06 |
| | | | | | 434/350 |
| 2007/0232461 | A1 | * | 10/2007 | Jenkins | A63B 21/0552 |
| | | | | | 482/93 |
| 2008/0191009 | A1 | * | 8/2008 | Gressel | H04W 4/021 |
| | | | | | 235/382 |
| 2015/0170448 | A1 | * | 6/2015 | Robfogel | G07C 9/20 |
| | | | | | 340/5.61 |
| 2016/0180618 | A1 | * | 6/2016 | Ho | G07C 9/00563 |
| | | | | | 340/5.52 |
| 2017/0243416 | A1 | * | 8/2017 | Chen | G07C 9/00571 |
| 2018/0036591 | A1 | * | 2/2018 | King | H04N 5/76 |
| 2018/0126222 | A1 | * | 5/2018 | Duale | G06Q 10/02 |

(Continued)

*Primary Examiner* — Folashade Anderson
(74) *Attorney, Agent, or Firm* — CALDWELL LLC

(57) ABSTRACT

Apparatus for classroom scheduling and method of use are disclosed. The apparatus includes at least a processor and a memory communicatively connected to the at least a processor. The memory includes instructions configuring the at least a processor to receive user data, wherein the user data includes a class preference, obtain class data, wherein the class data includes class information and a class constraint, classify the user data into one or more user data groups, wherein the one or more user data groups includes a class preference group, classify the class data into one or more fitness class groups, wherein the one or more fitness class groups includes a class constraint group, generate a user preferred class as a function of the class preference group, generate a classroom timetable for a fitness classroom as a function of the user preferred class and the class constraint group.

18 Claims, 8 Drawing Sheets

(56)          References Cited

U.S. PATENT DOCUMENTS

| | | | |
|---|---|---|---|
| 2020/0016457 A1* | 1/2020 | Ben-Chanoch | .... A63B 24/0006 |
| 2020/0219216 A1 | 7/2020 | Davis | |
| 2020/0302344 A1 | 9/2020 | Just | |
| 2021/0134433 A1* | 5/2021 | Burd | ...................... G16H 20/60 |

* cited by examiner

100

Processor 108

Memory 112

Fitness Database 120

Access Control Device 198

User 104

User Device 132

User Response 192

User Code 196

Class Data 136

Class Information 140

Class Constraint 144

User Data 116

Class Preference 128

User Information 124

Fitness Class Group 160

Class Constraint Group 168

Group Classifier 156

Group Training Data 164

User Data Group 148

Class Preference Group 152

Preference List 176

User Preferred Class 172

Timetable Machine Learning Model 184

Timetable Training Data 188

Classroom Timetable 180

*FIG. 1*

700

705 Receiving User Data, Wherein the User Data Comprises a Class Preference

710 Obtaining Class Data, Wherein the Class Data Comprises Class Information and a Class Constraint 715 Classifying the User Data into One or More User Data Groups 720 Classifying the Class Data into One or More Fitness Class Groups, Wherein the One or More Fitness Class Groups Comprises a Class Constraint Group 725 Generating a User Preferred Class as a Function of the Class Preference Group of the One or More User Data Groups 730 Generating a Classroom Timetable for a Fitness Classroom as a Function of the User Preferred Class and the Class Contraint Group

*FIG. 7*

APPARATUS FOR CLASSROOM SCHEDULING AND METHOD OF USE

FIELD OF THE INVENTION

The present invention generally relates to the field of fitness class. In particular, the present invention is directed to an apparatus for classroom scheduling and a method of use.

BACKGROUND

Effective scheduling is essential for the fitness industry that is a rapidly growing market, with an increasing demand for innovative and effective workout solutions. Existing solutions to address the demand are not sufficient.

SUMMARY OF THE DISCLOSURE

In an aspect, an apparatus for classroom scheduling is disclosed. The apparatus includes at least a processor and a memory communicatively connected to the at least a processor. The memory includes instructions configuring the at least a processor to receive user data, wherein the user data includes a class preference, obtain class data, wherein the class data includes class information and a class constraint, classify the user data into one or more user data groups, wherein the one or more user data groups includes a class preference group, classify the class data into one or more fitness class groups, wherein the one or more fitness class groups includes a class constraint group, generate a user preferred class as a function of the class preference group of the one or more user data groups, generate a classroom timetable for a fitness classroom as a function of the user preferred class and the class constraint group of the one or more fitness class groups.

In another aspect, a method for scheduling for a classroom is disclosed. The method includes receiving, using at least a processor, user data, wherein the user data includes a class preference, obtaining, using the at least a processor, class data, wherein the class data includes class information and a class constraint, classifying, using the at least a processor, the user data into one or more user data groups, classifying, using the at least a processor, the class data into one or more fitness class groups, wherein the one or more fitness class groups includes a class constraint group, generating, using the at least a processor, a user preferred class as a function of the class preference group of the one or more user data groups and generating, using the at least a processor, a classroom timetable for a fitness classroom as a function of the user preferred class and the class constraint group of the one or more fitness class groups.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 1 is a block diagram of an apparatus for classroom scheduling;

FIG. 7 is a flow diagram of an exemplary method for scheduling for a classroom.

Figure 2:
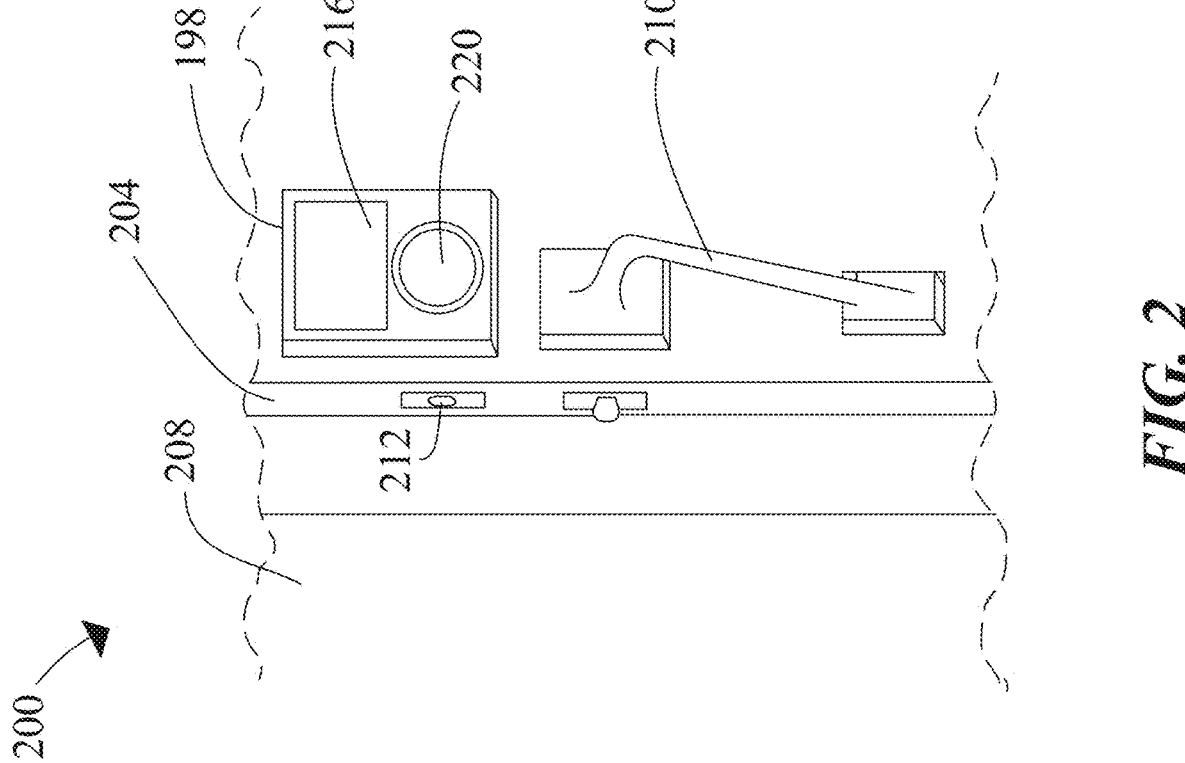
FIG. 2 is an exemplary embodiment of an entry of a fitness classroom with an access control device.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for classroom scheduling. The apparatus includes at least a processor and a memory communicatively connected to the at least a processor. The memory includes instructions configuring the at least a processor to receive user data, wherein the user data includes a class preference, obtain class data, wherein the class data includes class information and a class constraint, classify the user data into one or more user data groups, wherein the one or more user data groups includes a class preference group, classify the class data into one or more fitness class groups, wherein the one or more fitness class groups includes a class constraint group, generate a user preferred class as a function of the class preference group of the one or more user data groups, generate a classroom timetable for a fitness classroom as a function of the user preferred class and the class constraint group of the one or more fitness class groups.

A method for scheduling for a classroom includes receiving, using at least a processor, user data, wherein the user data includes a class preference, obtaining, using the at least a processor, class data, wherein the class data includes class information and a class constraint, classifying, using the at least a processor, the user data into one or more user data groups, classifying, using the at least a processor, the class data into one or more fitness class groups, wherein the one or more fitness class groups includes a class constraint group, generating, using the at least a processor, a user preferred class as a function of the class preference group of the one or more user data groups and generating, using the at least a processor, a classroom timetable for a fitness classroom as a function of the user preferred class and the class constraint group of the one or more fitness class groups.

Aspects of the present disclosure can be used to examine users' preference related to a fitness class. Aspects of the present disclosure can also be used to receive users' feedback related to the fitness class. Aspects of the present disclosure also allow for the users to use and/or rent an empty classroom, which is a fitness classroom that does not have the fitness class to be taken. Exemplary embodiments illustrating aspects of the present disclosure are described below in the context of several specific examples.

Referring now to FIG. 1, an exemplary embodiment of an apparatus 100 for classroom scheduling is illustrated. For the purposes of this disclosure, a "classroom" is a space for a class. In some embodiments, the classroom may include a fitness classroom, pottery classroom, mathematics classroom, English classroom, high school classroom, university classroom, and the like. For the purposes of this disclosure, a "fitness classroom" is a space for a fitness class. In some embodiments, the fitness classroom may include various types of classrooms. In some embodiments, the fitness classroom may include a room with a plurality of sizes. As a non-limiting example, the fitness classroom may include a room for 1 person, 2, 5, 10, 30, 50, 100 people, and the like. In an embodiment, the fitness classroom may include an indoor classroom. In another embodiment, the fitness classroom may include an outdoor classroom. As a non-limiting example, a fitness class may be held at a park, rooftop, and the like. In some embodiments, the fitness classroom may include a personal space, such as but not limited to a user 104's room, house, office, and the like. For the purposes of this disclosure, a "user" is any person, group or entity that wants to take a fitness class. In some embodiments, a user 104 may include one or more users 104. In some embodiments, the fitness classroom may include a virtual space. For the purposes of this disclosure, a "virtual space" is a space of computer-simulated environment. In some embodiments, the fitness classroom may include an augmented space. For the purposes of this disclosure, an "augmented space" is a physical space overlaid with dynamically changing information. Additional disclosure related to the fitness classroom may be found in U.S. patent application Ser. No. 18/369,023, filed on Sep. 15, 2023, entitled "A FITNESS CLASSROOM ASSEMBLY AND A METHOD OF USE," the entirety of which is incorporated as a reference. Additional disclosure related to generation of fitness classes may be found in U.S. patent application Ser. No. 18/368,867, filed on Sep. 15, 2023, entitled "SYSTEMS AND METHODS FOR FITNESS CLASS GENERATION," the entirety of which is incorporated as a reference. Additional disclosure related to administration of fitness classes may be found in U.S. patent application Ser. No. 18/368,947, filed on Sep. 15, 2023, entitled "APPARATUS FOR CLASS ADMINISTRATION AND A METHOD OF USE," the entirety of which is incorporated as a reference.

With continued reference to FIG. 1, for the purposes of this disclosure, a "fitness class" is a class for any type of physical exercise. As a non-limiting example, the fitness class may include a dancing class, ballroom dancing class, Zumba class, aerobics class, circus techniques class, gymnastics class, Pilates class, kettlebell workouts class, circuit workouts class, partner-based exercises class, martial arts class, wrestling class, CrossFit class, boxing class, jiujitsu class, judo class, karate class, kung fu class, taekwondo class, hapkido class, Silat class, Escrima class, Arnis class, Kali class, boxing class, Muay Thai class, kickboxing class, tai chi class, yoga such as but not limited to hatha class, vinyasa class, Bikram class, restorative class, yin class, ashtanga class, Iyengar class, hot yoga class, Tai chi class, and the like. In an embodiment, the fitness class may include a prerecorded class. In another embodiment, the fitness class may include a real-time live class. In some embodiments, the fitness class may include an in-person class. Persons skilled in the art, upon reviewing the entirety of this disclosure, may appreciate various fitness classes that may be used for an apparatus 100.

With continued reference to FIG. 1, an apparatus 100 includes at least a processor 108. At least a processor 108 may include, without limitation, any processor described in this disclosure. At least a processor 108 may be included in a computing device. At least a processor 108 may include any computing device as described in this disclosure, including without limitation a microcontroller, microprocessor, digital signal processor (DSP) and/or system on a chip (SoC) as described in this disclosure. The at least a processor 108 may include, be included in, and/or communicate with a mobile device such as a mobile telephone or smartphone. The at least a processor 108 may include a single computing device operating independently, or may include two or more computing device operating in concert, in parallel, sequentially or the like; two or more computing devices may be included together in a single computing device or in two or more computing devices. At least a processor 108 may interface or communicate with one or more additional devices as described below in further detail via a network interface device. Network interface device may be utilized for connecting at least a processor 108 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. At least a processor 108 may include but is not limited to, for example, a computing device or cluster of computing devices in a first location and a second computing device or cluster of computing devices in a second location. At least a processor 108 may include one or more computing devices dedicated to data storage, security, distribution of traffic for load balancing, and the like. The at least a processor 108 may distribute one or more computing tasks as described below across a plurality of computing devices of computing device, which may operate in parallel, in series, redundantly, or in any other manner used for distribution of tasks or memory between computing devices. At least a processor 108 may be implemented, as a non-limiting example, using a "shared nothing" architecture.

With continued reference to FIG. 1, at least a processor 108 may be designed and/or configured to perform any method, method step, or sequence of method steps in any embodiment described in this disclosure, in any order and with any degree of repetition. For instance, the at least a processor 108 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. The at least a processor 108 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, an apparatus 100 includes a memory 112 communicatively connected to at least a processor 108. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, a memory 112 includes instructions configuring at least a processor 108 to receive user data 116. For the purposes of this disclosure, "user data" is data that is related to a user who wants to take a fitness class. In some embodiments, the user data 116 may include a format of text, icon, image, animation, audio, and the like. In some embodiments, the user data 116 may include a plurality of user data 116 from one or more users 104. As a non-limiting example, the one or more users 104 may input the user data 116 at the same time, at different times, and the like. In some embodiments, the user data 116 may be stored in a fitness database 120. In some embodiments, the user data 116 may be retrieved from the fitness database 120. The fitness database disclosed herein is further described below.

With continued reference to FIG. 1, in an embodiment, user data 116 may include user information 124. For the purposes of this disclosure, "user information" is information related to a user. As a non-limiting example, the user information 124 of the user data 116 may include age, gender, name, athletic abilities, fitness experience, fitness goals, fitness history, diet goals, diet history, injury history, medication history, and the like. Persons skilled in the art, upon reviewing the entirety of this disclosure, may appreciate various user information 124 that may be used as the user data 116.

With continued reference to FIG. 1, in another embodiment, user data 116 may include a class preference 128. In some embodiments, the class preference 128 may include one or more class preferences. For the purposes of this disclosure, a "class preference" is a preference of a user related to a fitness class. As a non-limiting example, the class preference 128 of the user data 116 may include a preference for a specific fitness class, specific time of the fitness class, specific duration of the fitness class, a specific instructor for the fitness class, a specific class day for the fitness class, and the like. For example and without limitation, the specific fitness class of the class preference 128 may include the preference of the user 104 that the user 104 prefers to take hot yoga classes. For another example and without limitation, the specific fitness class of the class preference 128 may include the preference of the user 104 that the user 104 prefers to take an ashtanga class and a Pilates class. For example and without limitation, the specific time of the fitness class of the class preference 128 may include the preference of the user 104 that the user 104 prefers to take the fitness class in the morning, afternoon, evening, midnight, and the like. For another example and without limitation, the specific time of the fitness class of the class preference 128 may include the preference of the user 104 that the user 104 prefers to take the fitness class at 5 a.m., 8 a.m., 12 p.m. 3 p.m. 11 p.m., 2 a.m., and the like. For example and without limitation, the specific duration of the fitness class of the class preference 128 may include the preference of the user 104 that the user 104 prefers to take the fitness class that includes a class duration of 15 mins, 30 mins, 45 mins, 60 mins, 90 mins, 120 mins, and the like. For example and without limitation, the specific day for the fitness class of the class preference 128 may include the preference of the user 104 that the user 104 prefers to take the fitness class on Monday, Tuesday, Wednesday, Thursday, Friday, Saturday, Sunday, and/or any combination of the days such as but not limited to Monday and Wednesday, Tuesday and Friday, Saturday and Sunday, and the like. For example and without limitation, the specific instructor for the fitness class of the class preference 128 may include the preference of the user 104 that the user 104 prefers to take the fitness class that is taught by a specific instructor with, such as but not limited to a specific name, a specific fitness experience, a specific gender, a specific teaching experience, and the like.

With continued reference to FIG. 1, in some embodiments, at least a processor 108 may receive user data 116 from a fitness database 120. As used in this disclosure, "fitness database" is a data structure configured to store data associated with a fitness class and a user. In one or more embodiments, the fitness database 120 may include input or calculated information and data related to the fitness class and user. A datum history may be stored in the fitness database 120. The datum history may include real-time and/or previous input class data 136 and/or user data 116. At least a processor 108 may be communicatively connected with the fitness database 120. For example, and without limitation, in some cases, the fitness database 120 may be local to the at least a processor 108. In another example, and without limitation, the fitness database 120 may be remote to at least a processor 108 and communicative with the at least a processor 108 by way of one or more networks. A network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure the at least a processor connects directly, dynamically, and non-hierarchically to as many other computing devices as possible. A "network topology" as used in this disclosure is an arrangement of elements of a communication network. Network may use an immutable sequential listing to securely the fitness database 120. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, at least a processor 108 may receive user data 116 from a user device 132. For the purposes of this disclosure, a "user device" is a device that a user uses for a fitness class. As a non-limiting example, user device 132 may include a smartphone, laptop, tablet, smart watch, and the like. As another non-limiting example, user device 132 may include a wired or wireless mouse, a touchpad, a touchscreen, a game controller, keyboard, microphone, and the like. In some embodiments, the user device 132 may include one or more user devices 132 that may be used by one or more users 104. As a non-limiting example, each of the one or more users 104 may use each of the one or more user device 132 to input the user data 116. For example and without limitation, each of the one or more user 104 may use a smartphone that may be a personal smartphone to input the user data 116. As another non-limiting example, each of the one or more users 104 may use one user device 132 to input the user data 116. For example and without limitation, user device 132 may include a tablet that may be used for any one or more users 104 in a fitness classroom.

With continued reference to FIG. 1, in some embodiments, a user 104 may input user data 116 using various methods. As a non-limiting example, user 104 may input the user data 116 on a user device 132 by typing on a keyboard. As another non-limiting example, user 104 may input the user data 116 on the user device 132 by clicking an image of an instructor. As another non-limiting example, user 104 may input the user data 116 on the user device 132 by checking a checkbox for choosing a class preference 128.

The class preference 128 disclosed herein is further described below. The user device disclosed herein is further described below. In some embodiments, the user data 116 may include a choice the user 104 made between other choices. As a non-limiting example, user 104 may choose one instructor between several names of instructors to input the class preference of the user data 116 on the user device 132. Persons skilled in the art, upon reviewing the entirety of this disclosure, may appreciate various ways for the user 104 to input the user data 116 on the user device 132. Additionally and without limitation, the user device 132 disclosed herein may be consistent with a user device as described in references incorporated by reference herein.

With continued reference to FIG. 1, memory 112 includes instructions configuring at least a processor 108 to obtain class data 136. For the purposes of this disclosure, "class data" is data related to a fitness class. In some embodiments, the class data 136 may include a format of text, icon, image, animation, audio, and the like. In some embodiments, the class data 136 may be stored in a fitness database 120. In some embodiments, the class data 136 may be retrieved from the fitness database 120.

With continued reference to FIG. 1, in some embodiments, class data 136 includes class information 140. For the purposes of this disclosure, "class information" is information related to a fitness class and a fitness classroom. In an embodiment, the class information 140 may include fitness class information. For the purposes of this disclosure, "fitness class information" is information related to a fitness class. As a non-limiting example, the fitness class information of the class information 140 may include a type of a fitness class, a name of the fitness class, class review, class attendance history, class capacity, class time, class date, class duration, a name of an instructor of the fitness class, instructor gender, a name of other classes an instructor teaches, instructor fitness experience, instructor teaching experience, current number of (count of) users wanting the fitness class, lighting setup for the fitness class, temperature setup for the fitness class, and the like. Persons skilled in the art, upon reviewing the entirety of this disclosure, may appreciate various fitness class information that may be used as the class information 140.

With continued reference to FIG. 1, in another embodiment, class information 140 may include classroom information. For the purposes of this disclosure, "classroom information" is information related to a fitness classroom of a fitness class. As a non-limiting example, the classroom information of the class information 140 may include a size of the fitness classroom, temperature range that the fitness classroom can control, lighting of the fitness classroom, a location of the fitness classroom, interior design of the fitness classroom, accessibility for a disabled user 104, and the like. For example and without limitation, the location of the fitness classroom of the classroom information may include address of the fitness classroom, which floor of a building the fitness classroom is at, and the like. For another example and without limitation, the accessibility for the disabled user 104 of the classroom information may include if the building the fitness classroom is at has stairs, elevators, ramps, which floor of the building the fitness classroom is at, and the like. Persons skilled in the art, upon reviewing the entirety of this disclosure, may appreciate various classroom information that may be used as class information 140.

With continued reference to FIG. 1, in some embodiments, class data 136 includes a class constraint 144. In some embodiments, the class data 136 may include a plurality of class constraints 144. For the purposes of this disclosure, "class constraint" is a restriction related to a fitness class and a fitness classroom. In an embodiment, the class constraint 144 may include a fitness class constraint. For the purposes of this disclosure, a "fitness class constraint" is a constraint that is related to a fitness class. As a non-limiting example, the fitness class constraint of class 144 may include a class capacity, class duration, class hour, instructor availability, user experience, and the like. For example and without limitation, the class capacity of the fitness class constraint May include a number of users that can take the fitness class. For another example and without limitation, the class duration of the fitness class constraint may include a constraint that a hot yoga class should take 90 minutes for one fitness class. For another example and without limitation, the class hour of the fitness class constraint may include a constraint that a Tai chi class should be taken at 6 a.m. For another example and without limitation, the instructor availability of the fitness class constraint may include instructor's available times that the instructor can teach the fitness class such as but not limited to 5-7a.m., 5-10p.m., 11a.m. to 3p.m., and the like. For example and without limitation, the instructor availability of the fitness class constraint may include instructor's available days that the instructor can teach the fitness class such as but not limited to Monday, Tuesday, Wednesday, Thursday, Friday, Saturday, Sunday, and/or any combination of the days such as but not limited to Monday and Wednesday, Tuesday and Friday, Saturday and Sunday, and the like. For another example and without limitation, the user experience of the fitness class constraint may include a constraint that in order to take a Vinyasa class, the user experience may include 'advanced.' Persons skilled in the art, upon reviewing the entirety of this disclosure, may appreciate various fitness class constraints that may be used as class constraint 144.

With continued reference to FIG. 1, in another embodiment, a class constraint 144 may include a classroom constraint. For the purposes of this disclosure, a "classroom constraint" is a constraint related to a classroom. As a non-limiting example, the classroom constraint may include a classroom location, classroom size, classroom temperature, classroom lighting, and the like. For example and without limitation, the classroom location of the classroom constraint may include a floor constraint such as but not limited to a fitness classroom that is on a second floor may not have a Zumba class or any class that requires jumping or any movements that may create noise between floors. For another example and without limitation, the classroom location of the classroom constraint may include a circus techniques class must be on a first floor. For another example and without limitation, the classroom size of the classroom constraint may include a constraint that the fitness classroom smaller than 20×20 floor size may not take a dancing class. For another example and without limitation, the classroom temperature of the classroom constraint may include the fitness classroom that does not have a temperature control system that can increase a temperature of the fitness classroom to 35 Celsius may not take a hot yoga class. Persons skilled in the art, upon reviewing the entirety of this disclosure, may appreciate various classroom constraints that may be used as class constraint 144.

With continued reference to FIG. 1, in another embodiment, a class constraint 144 may include a previous class constraint. For the purposes of this disclosure, a "previous class constraint" is a constraint for a fitness class that is generated to avoid a conflict with another fitness class that was taken in a fitness classroom before the fitness class. As a non-limiting example, the previous class constraint of the class constraint 144 may include a constraint that if a previous class in the fitness classroom was a hot yoga class, the next class should not be a cold yoga class.

With continued reference to FIG. 1, in another embodiment, a class constraint 144 may include an environment constraint. For the purposes of this disclosure, an "environment constraint" is a constraint for a fitness class that is generated to avoid disturbance in the fitness class between users taking the fitness class, where the fitness class may include a virtual and/or augmented reality involved fitness class. As a non-limiting example, when the fitness class includes a virtual reality involved fitness class using a virtual reality headset, the environment constraint of the class constraint that one fitness class should not be a cold yoga class when another fitness class is a hot yoga class. As another non-limiting example, when the fitness class includes the virtual reality involved fitness class using the virtual reality headset, the environment constraint of the class constraint that one fitness class should not be a boxing class when another fitness class is a restorative class so that the users 104 taking the fitness classes may not disturb each other.

With continued reference to FIG. 1, in an embodiment, at least a processor 108 may obtain class data 136 from a fitness database 120. The fitness database 120 disclosed herein is further described above. In another embodiment, at least a processor 108 may obtain the class data 136 from an instructor. For the purposes of this disclosure, an "instructor" is any person that teaches a fitness class. In some embodiments, the instructor may include one or more instructors. As a non-limiting example, the one or more instructors may include the one or more instructors that teach different fitness classes. In some embodiments, the instructor may utilize an instructor device to input class data 136. For the purposes of this disclosure, "instructor device" is a device that an instructor uses for a fitness class. As a non-limiting example, the instructor device may include a smartphone, laptop, tablet, smart watch, and the like. As another non-limiting example, user device 132 may include a wired or wireless mouse, a touchpad, a touchscreen, a game controller, keyboard, microphone, and the like. For example and without limitation, the instructor may input the class data 136 on the instructor device by typing on the keyboard. For another example and without limitation, the instructor may input the class data 136 on the instructor device by touching the touch screen. The instructor device disclosed herein may be consistent with a user device 132. Additionally and without limitation, the instructor device disclosed herein may be consistent with an instructor device as described in matters incorporated by reference herein.

With continued reference to FIG. 1, memory 112 includes instructions configuring at least a processor 108 to classify user data 116 into one or more user data groups 148. For the purposes of this disclosure, "user data group" is a set of associative user data. In an embodiment, the one or more user data groups 148 may include a user information group. For the purposes of this disclosure, a "user information group" is a group of associative user information of user data. As a non-limiting example, the user information group of the one or more user data groups 148 may include an age group, gender group, name group, athletic abilities group, fitness experience group, fitness goals group, fitness history group, diet goals group, diet history group, injury history group, medication history group, and the like. Persons skilled in the art, upon reviewing the entirety of this disclosure, may appreciate various user information groups that may be used as the one or more user data groups 148.

With continued reference to FIG. 1, in another embodiment, one or more user data groups 148 includes a class preference group 152. For the purposes of this disclosure, a "class preference group" is a group of associative class preference of user data. As a non-limiting example, the class preference group 152 of the one or more user data groups 148 may include a specific fitness class group, specific time group, specific duration group, a specific instructor group, a specific class day group, and the like. In some embodiments, the class preference group 152 may include a sub-group. For the purposes of this disclosure, a "sub-group" is a subdivision of a group. As a non-limiting example, the specific instructor group of the class preference group 152 may include a specific name group, a specific fitness experience group, a specific gender group, a specific teaching experience group, and the like. Persons skilled in the art, upon reviewing the entirety of this disclosure, may appreciate various class preference groups 152 that may be used as the one or more user data groups 148.

With continued reference to FIG. 1, in some embodiments, a class preference group 152 of one or more user data groups 148 may include a plurality of class preferences 128 of user data 116. As a non-limiting example, when one or more users 104, such as and without limitation four (4) users 104 input the same class preferences 128, such as and without limitation '30 minutes of a fitness class,' then a specific duration group of the class preference group 152 may include 4 '30 minutes of a fitness class.' As another non-limiting example, when the one or more users 104, such as and without limitation six (6) users 104 input the same class preferences 128, such as and without limitation 'female instructor,' then a specific gender group of a specific instructor group of the class preference group 152 may include 6 'female instructor.' As another non-limiting example, when the one or more users 104, such as and without limitation six (6) users 104 input the same specific fitness classes of the class preferences 128, such as and without limitation two (2) users 104 input 'hot yoga class' and 4 users 104 input 'Muay Thai class,' then a specific fitness class group of the class preference group 152 may include 2 'hot yoga class' and 4 'Muay Thai class.'

With continued reference to FIG. 1, in some embodiments, user data 116 may be classified into one or more user data groups 148 using a group classifier 156. As used in this disclosure, a "group classifier" is a machine-learning model, such as a mathematical model, neural net, or program generated by a machine learning algorithm known as a "classification algorithm," that sorts user data and/or class data related inputs into categories or bins of data, outputting one or more user data groups and/or one or more fitness class groups associated therewith. The one or more fitness class groups 160 disclosed herein is further described below. The group classifier 156 disclosed herein may be consistent with a classifier disclosed with respect to FIG. 2.

With continued reference to FIG. 1, in some embodiments, a group classifier 156 may be trained with group training data 164 correlating user data 116 to one or more user data groups 148. For the purposes of this disclosure, "training data" is data containing correlations that a machine-learning process may use to model relationships between two or more categories of data elements. The training data disclosed herein is further disclosed with respect to FIG. 2. For the purposes of this disclosure, "group training data" is training data that is used to train the group classifier. As a non-limiting example, the group classifier 156 may be trained with the group training data 164 that correlates user information 124 of the user data 116 to a user information group of the one or more user data groups 148. For example and without limitation, the group training data 164 may correlate age of a user 104 of the user information 124 of the user data 116 to an age group of the user information group. For another example and without limitation, the group training data 164 may correlate fitness experience of the user 104 of the user information 124 of the user data 116 to a fitness experience group of the user information group. As another non-limiting example, the group classifier 156 may be trained with the group training data 164 that correlates a class preference of the user data 116 to a class preference group 152 of the one or more user data groups 148. For example and without limitation, the group training data 164 may correlate the preference of the user 104 that the user 104 prefers to take a fitness class at 5 a.m. of the class preference 128 of the user data 116 to a specific time group of the class preference group 152. For example and without limitation, the group training data 164 may correlate the preference of the user 104 that the user 104 prefers to take a fitness class that is taught by an instructor with a specific teaching experience of the class preference 128 of the user data 116 to a specific gender group of a specific instructor group of the class preference group 152. In some embodiments, the group training data 164 may be received from one or more users 104, one or more instructors, fitness database 120, external computing devices, and/or previous iterations of processing. As a non-limiting example, the group training data 164 may include instructions from a user, who may be an expert user, a past user, in embodiments disclosed herein, or the like, which may be stored in memory and/or stored in the fitness database 120, where the instructions may include labeling of training examples.

With continued reference to FIG. 1, in some embodiments, user data 116 may be classified to one or more user data groups 148 using a group lookup table. A "lookup table," for the purposes of this disclosure, is an array of data that maps input values to output values. The lookup table may be used to replace a runtime computation with an array indexing operation. As a non-limiting example, an input value of the group lookup table may include user data 116. As a non-limiting example, an output value of the group lookup table may include one or more user data groups 148. In an embodiment, the lookup table may include interpolation. For the purposes of this disclosure, an "interpolation" refers to a process for estimating values that lie between the range of known data. As a non-limiting example, the lookup table may include an output value for each of input values. When the lookup table does not define the input values, then the lookup table may estimate the output values based on the nearby table values. In another embodiment, the lookup table may include an extrapolation. For the purposes of this disclosure, an "extrapolation" refers to a process for estimating values that lie beyond the range of known data. As a non-limiting example, the lookup table may linearly extrapolate the nearest data to estimate an output value for an input beyond the data.

With continued reference to FIG. 1, in an embodiment, at least a processor 108 may be configured to retrieve or "lookup" a given user information 124 of user data 116 to find a corresponding one or more user data groups 148 using a group lookup table. In some embodiments, the at least a processor 108 may "lookup" in a fitness database 120 using the group lookup table to classify the user data 116 into the one or more user data groups 148. In some embodiments, the group lookup table may include any data structure associating one or more users 104 in the one or more user data groups 148. As a non-limiting example, the group lookup table may correlate age of a user 104 of the user information 124 of the user data 116 to an age group of a user information group of the one or more user data groups 148. As another non-limiting example, the group lookup table may correlate a fitness experience of the user 104 of the user information 124 of the user data 116 to a fitness experience group of the user information group. In another embodiment, the at least a processor 108 may be configured to "lookup" a given class preference 128 of user data 116 to find a corresponding one or more user data groups 148 using the group lookup table. As another non-limiting example, the group lookup table may correlate a preference of the user 104 that the user 104 prefers to take a fitness class at 5 a.m. of the class preference 128 of the user data 116 to a specific time group of a class preference group 152 of the one or more user data groups 148. As another non-limiting example, the group lookup table may correlate the preference of the user 104 that the user 104 prefers to take a fitness class that is taught by an instructor with a specific teaching experience of the class preference 128 of the user data 116 to a specific gender group of a specific instructor group of the class preference group 152.

With continued reference to FIG. 1, memory 112 includes instructions configuring at least a processor 108 to classify class data 136 into one or more fitness class groups 160. For the purposes of this disclosure, "fitness class group" is a set of associative class data. As a non-limiting example, the one or more fitness class groups 160 may include a dancing class group, ballroom dancing class group, Zumba class group, aerobics class group, circus techniques class group, gymnastics class group, Pilates class group, kettlebell workouts class group, circuit workouts class group, partner-based exercises class group, martial arts class group, wrestling class group, CrossFit class group, boxing class group, jiu-jitsu class group, judo class group, karate class group, kung fu class group, taekwondo class group, hapkido class group, Silat class group, Escrima class group, Arnis class group, Kali class group, boxing class group, Muay Thai class group, kickboxing class group, tai chi class group, yoga group such as but not limited to hatha class group, vinyasa class group, Bikram class group, restorative class group, yin class group, ashtanga class group, Iyengar class group, hot yoga class group, Tai chi class group, and the like. Persons skilled in the art, upon reviewing the entirety of this disclosure, may appreciate various fitness class groups 160 that may be used for an apparatus 100.

With continued reference to FIG. 1, memory 112 may include instructions configuring at least a processor 108 to classify classroom information of class data 136 into a classroom information group. For the purposes of this disclosure, a "classroom information group" is a set of associative information of a fitness classroom of a fitness class. As a non-limiting example, the classroom information group may include a fitness classroom size group, fitness classroom temperature range group, fitness classroom lighting group, fitness classroom interior design group, fitness classroom location group, accessibility group, and the like. In some embodiments, the classroom information group may include a sub-group of the classroom information group. For example and without limitation, the fitness classroom location group may include an address group, floor group, and the like. For another example and without limitation, the accessibility group may include a stairs group, elevators group, ramps group, floor group, and the like.

With continued reference to FIG. 1, class data 136 may be classified into a class information group. For the purposes of this disclosure, a "class information group" is a set of associative information of a fitness class and a fitness classroom. As a non-limiting example, the class information group may include a fitness class information group. For the purposes of this disclosure, a "fitness class information group" is a set of associative information of a fitness class. As a non-limiting example, the fitness class information group may include a fitness class name group, class review group, class attendance history group, class capacity group, class time group, class date group, class duration group, fitness class instructor name group, instructor gender group, a name of other classes an instructor teaches group, instructor fitness experience group, instructor teaching experience group, current number of (count of) users wanting the fitness class group, fitness class lighting setup group, fitness class temperature setup group, and the like.

With continued reference to FIG. 1, as another non-limiting example, class data 136 may be classified into a class constraint group 168. For the purposes of this disclosure, a "class constraint group" is a set of associative restrictions related to a fitness class and a fitness classroom. As a non-limiting example, the class constraint group 168 may include a fitness class constraint group. For the purposes of this disclosure, a "fitness class constraint group" is a set of associative constraints that is related to a fitness class. As a non-limiting example, the fitness class constraint group of the class constraint group 168 may include a class capacity group, class duration group, class hour group, instructor availability group, user experience group, and the like. In some embodiments, the fitness class constraint group may include a sub-group of the fitness class constraint group. For example and without limitation, the instructor availability group of the fitness class constraint group may include instructor available time group, instructor available day group, and the like.

With continued reference to FIG. 1, as another non-limiting example, a class constraint group 168 may include a classroom constraint group. For the purposes of this disclosure, a "classroom constraint group" is a set of associative constraints that is related to a fitness classroom of a fitness class. As a non-limiting example, the classroom constraint group of the class constraint group 168 may include classroom location group, classroom size group, classroom temperature group, classroom lighting group, and the like. As another non-limiting example, the class constraint group 168 may include a previous class constraint group. For the purposes of this disclosure, a "previous class constraint group" is a set of associative previous class constraints. As another non-limiting example, the class constraint group 168 may include an environment constraint group. For the purposes of this disclosure, an "environment constraint group" is a set of associative environment constraints group.

With continued reference to FIG. 1, in some embodiments, class data 136 may be classified into one or more fitness class groups 160 using a group classifier 156. The group classifier 156 disclosed herein is further described above. In some embodiments, the group classifier 156 may be trained with group training data 164 correlating class data 136 to one or more fitness class groups 160. The group training data 164 disclosed herein is further described above. In some embodiments, the group training data 164 may be received from one or more users 104, one or more instructors, fitness database 120, external computing devices, and/ or previous iterations of processing. As a non-limiting example, the group training data 164 may include instructions from a user, who may be an expert user, a past user, in embodiments disclosed herein, or the like, which may be stored in memory and/or stored in the fitness database 120, where the instructions may include labeling of training examples.

With continued reference to FIG. 1, in an embodiment, a group classifier 156 may be trained with group training data 164 that correlates class information 140 of class data 136 to one or more fitness class groups 160. As a non-limiting example, the group training data 164 may correlate a type of a fitness class to the fitness class group 160. For example and without limitation, the group training data 164 may correlate a jiujitsu class to a jiujitsu class group. For another example and without limitation, the group training data 164 may correlate a Bikram class to a Bikram class group. For another example and without limitation, the group training data 164 may correlate a hot yoga class to a hot yoga class group.

With continued reference to FIG. 1, in another embodiment, a group classifier 156 may be trained with group training data 164 that correlates classroom information of class data 136 to a classroom information group. As a non-limiting example, the group training data 164 may correlate a size of a fitness classroom, such as without limitation 25×25, of the classroom information to a classroom size group of the classroom information group. As another non-limiting example, the group training data 164 may correlate the classroom information that includes an elevator in a building for the fitness classroom to an elevator group of an accessibility group of the classroom information group.

With continued reference to FIG. 1, in another embodiment, a group classifier 156 may be trained with group training data 164 that correlates class information 140 of class data 136 to a class information group, of one or more fitness class groups 160. As a non-limiting example, the group training data 164 may correlate fitness class information of the class information 140 of the class data 136 to a fitness class information group of the class information group of the one or more fitness class groups 160. For example and without limitation, the group training data 164 May correlate a gender of an instructor teaching a hot yoga class, such as without limitation male, of the fitness class information to an instructor gender group of the fitness class information group of the class information group of the one or more fitness class groups 160, the hot yoga class group. For another example and without limitation, the group training data 164 may correlate a duration of a Bikram class, such as without limitation 60 minutes, of the fitness class information to a class duration group of the fitness class information group of the class information group of the one or more fitness class groups 160, the Bikram class group.

With continued reference to FIG. 1, in another embodiment, a group classifier 156 may be trained with group training data 164 that correlates a class constraint 144 to a class constraint group of one or more fitness class groups 160. As a non-limiting example, the group training data 164 may correlate a fitness class constraint of the class constraint 144 to a fitness class constraint group of the class constraint group. For example and without limitation, the group training data 164 may correlate the fitness class constraint of a Tai chi class should be taken at 6 a.m. to a class hour group of the fitness class constraint group. For another example and without limitation, the group training data 164 may correlate the fitness class constraint of an instructor teaching a Vinyasa class can only teach on Monday and Wednesday to an instructor available day group of an instructor availability group of the fitness class constraint group.

With continued reference to FIG. 1, as another non-limiting example, a group classifier 156 may be trained with group training data 164 that correlates a classroom constraint 144 to a classroom constraint group of a class constraint group. For example and without limitation, the group training data 164 may correlate the classroom constraint that a dancing class should not be taught in a fitness classroom smaller than 20×20 floor to a classroom size group of the classroom constraint group. For another example and without limitation, the group training data 164 may correlate the classroom constraint that a hot yoga class should not be taught in the fitness classroom that cannot increase a temperature of the fitness classroom to 40 Celsius to a class temperature group of the classroom constraint group.

With continued reference to FIG. 1, in another embodiment, a group classifier 156 may be trained with group training data 164 that correlates a previous class constraint of a class constraint 144 to a previous class constraint group of a class constraint group. As another non-limiting example, the group training data 164 may correlate the previous class constraint that a cold yoga class cannot be taught after a hot yoga class to the previous class constraint group.

With continued reference to FIG. 1, in another embodiment, a group classifier 156 may be trained with group training data 164 that correlates an environment class constraint of a class constraint 144 to an environment class constraint group of a class constraint group. As a non-limiting example, the group training data 164 may correlate the environment class constraint that when the fitness class is held with a virtual reality device, one fitness class should not be a boxing class while another fitness class is a restorative class to the environment class constraint group.

With continued reference to FIG. 1, in some embodiments, class data 136 may be classified to one or more fitness class groups 160 using a group lookup table. In some embodiments, the at least a processor 108 may "lookup" in a fitness database 120 using the group lookup table to classify the class data 136 into the one or more fitness class groups 160. In some embodiments, the group lookup table may include any data structure associating fitness classes and fitness classrooms in the one or more fitness class groups 160. The group lookup table disclosed herein is further described above. As a non-limiting example, an input value of the group lookup table may include class data 136. As a non-limiting example, an output value of the group lookup table may include one or more fitness class groups 160. In some embodiments, at least a processor 108 may be configured to "lookup" a given class data 136 to find corresponding one or more fitness class groups 160 using the group lookup table.

With continued reference to FIG. 1, in an embodiment, at least a processor 108 may be configured to "lookup" given class information 140 of class data 136 to find corresponding one or more fitness class group 160 using a group lookup table. As a non-limiting example, the group lookup table may correlate a type of a fitness class to the fitness class group 160. For example and without limitation, the group lookup table may correlate a jiujitsu class to a jiujitsu class group. For another example and without limitation, the group lookup table may correlate a Bikram class to a Bikram class group. For another example and without limitation, the group lookup table may correlate a hot yoga class to a hot yoga class group.

With continued reference to FIG. 1, in another embodiment, at least a processor 108 may be configured to "lookup"

given classroom information of class data 136 to find corresponding classroom information group using a group lookup table. As a non-limiting example, the group lookup table may correlate a size of a fitness classroom, such as without limitation 25×25, of the classroom information to a classroom size group of the classroom information group. As another non-limiting example, the group lookup table may correlate the classroom information that includes an elevator in a building for the fitness classroom to an elevator group of an accessibility group of the classroom information group.

With continued reference to FIG. 1, in another embodiment, at least a processor 108 may be configured to "lookup" given class information 140 of class data 136 to find corresponding class information group of one or more fitness class groups 160 using a group lookup table. As a non-limiting example, the group lookup table may correlate fitness class information of the class information 140 of the class data 136 to a fitness class information group of the class information group of the one or more fitness class groups 160. For example and without limitation, the group lookup table may correlate a gender of an instructor teaching a hot yoga class, such as without limitation male, of the fitness class information to an instructor gender group of the fitness class information group of the class information group of the one or more fitness class groups 160, the hot yoga class group. For another example and without limitation, the group lookup table may correlate a duration of a Bikram class, such as without limitation 60 minutes, of the fitness class information to a class duration group of the fitness class information group of the class information group of the one or more fitness class groups 160, the Bikram class group.

With continued reference to FIG. 1, in another embodiment, at least a processor 108 may be configured to "lookup" given class constraint 144 to find a corresponding class constraint group of one or more fitness class groups 160 using a group lookup table. As a non-limiting example, the group lookup table may correlate a fitness class constraint of the class constraint 144 to a fitness class constraint group of the class constraint group. For example and without limitation, the group lookup table may correlate the fitness class constraint of a Tai chi class should be taken at 6 a.m. to a class hour group of the fitness class constraint group. For another example and without limitation, the group lookup table may correlate the fitness class constraint of an instructor teaching a Vinyasa class can only teach on Monday and Wednesday to an instructor available day group of an instructor availability group of the fitness class constraint group.

With continued reference to FIG. 1, as another non-limiting example, at least a processor 108 may be configured to "lookup" given classroom constraint of a class constraint 144 to find a corresponding classroom constraint group of a class constraint group using a group lookup table. For example and without limitation, the group lookup table may correlate the classroom constraint that a dancing class should not be taught in a fitness classroom smaller than 20×20 floor to a classroom size group of the classroom constraint group. For another example and without limitation, the group lookup table may correlate the classroom constraint that a hot yoga class should not be taught in the fitness classroom that cannot increase a temperature of the fitness classroom to 40 Celsius to a class temperature group of the classroom constraint group.

With continued reference to FIG. 1, in another embodiment, at least a processor 108 may be configured to "lookup"

given previous class constraint of a class constraint 144 to find a corresponding previous class constraint group of a class constraint group using a group lookup table. As another non-limiting example, the group lookup table may correlate the previous class constraint that a cold yoga class cannot be taught after a hot yoga class to the previous class constraint group.

With continued reference to FIG. 1, in another embodiment, at least a processor 108 may be configured to "lookup" given environment class constraint of a class constraint 144 to find a corresponding environment class constraint group of a class constraint group using a group lookup table. As a non-limiting example, the group lookup table may correlate the environment class constraint that when the fitness class is held with a virtual reality device, one fitness class should not be a boxing class while another fitness class is a restorative class to the environment class constraint group.

With continued reference to FIG. 1, a memory 112 includes instructions configuring at least a processor 108 to generate a user preferred class 172 as a function of a class preference group 152 of one or more user data groups 148. For the purposes of this disclosure, a "user preferred class" is a fitness class built for a user based on the user's class preference. As a non-limiting example, the user preferred class may include a jiujitsu class at 10 a.m. that takes 60 minutes of class duration taught by a female instructor that has taught the jiujitsu class for 10 years. As another non-limiting example, the user preferred class may include a hot yoga class that is taught by a female instructor that has practiced yoga for 20 years. As another non-limiting example, the user preferred class may include a Muay Thai class that is taught in a classroom that is bigger than 20×20 and on a first floor of a building. In some embodiments, the user preferred class 172 may be stored in a fitness database 120. In some embodiments, the user preferred class 172 may be retrieved from the fitness database 120. In some embodiments, one or more users 104 and/or an instructor may manually input the user preferred class 172.

With continued reference to FIG. 1, in some embodiment, a user preferred class 172 may be generated using a preference list 176. For the purposes of this disclosure, a "preference list" is a list of class preference elements. For the purposes of this disclosure, a "class preference element" is an element of a preference list 176 that includes class preferences of user data. In some embodiments, the preference list 176 may include the class preference elements in an order from a highest class preference element to a lowest class preference element. For the purposes of this disclosure, a "highest class preference element" is a class preference element in a preference list 176 that includes the most class preference of user data. In other words, one or more users 104 may want to take a fitness class that includes the highest class preference element the most. For the purposes of this disclosure, a "lowest class preference element" is a class preference element in a preference list 176 that includes the least class preference of user data. In other words, one or more users 104 May want to take the fitness class that includes the lowest class preference element the least. As a non-limiting example, when a specific class fitness group of the class preference group 152 includes 2 'hot yoga class,' 4 'Muay Thai class,' 8 'jiujitsu class' and 6 'circus techniques class,' the preference list 176 may include the class preference elements in an order of the following: 'jiujitsu class,' 'circus techniques class,' 'Muay Thai class' and 'hot yoga class,' where the 'jiujitsu class' may be the highest class preference element and the 'hot yoga class' is the lowest class preference element. As another non-limiting example, when a specific gender group of a specific instructor group of the class preference group 152 includes 10 'female instructor' and 4 'male instructor,' then the preference list 176 may include the class preference elements in an order of the following: 'female instructor' and 'male instructor,' where the 'female instructor' may be the highest class preference element and the "male instructor' is the lowest class preference element.

With continued reference to FIG. 1, in some embodiments, a user preferred class 172 may be generated with a plurality of highest class preference elements of preference lists 176 of each group of class preference groups 152. As a non-limiting example, when the preference list 176 of a specific class fitness group of the class preference group 152 includes 'jiujitsu class,' 'circus techniques class,' 'Muay Thai class' and 'hot yoga class' and the preference list 176 of a specific gender group of a specific instructor group of the class preference group 152 includes 'female instructor' and 'male instructor,' the user preferred class 172 may include a fitness class that is a jiujitsu class that is taught by a female instructor. As another non-limiting example, when the preference list 176 of a specific class fitness group of the class preference group 152 includes 'Muay Thai class,' 'jiujitsu class,' 'circus techniques class,' and 'hot yoga class,' the preference list 176 of a specific gender group of a specific instructor group of the class preference group 152 includes 'male instructor' and 'female instructor,' the preference list 176 of a specific time group of the class preference group 152 includes '10a.m.' '3 p.m.' '11a.m.' '7p.m.' and '5 a.m.,' and the preference list 176 of a specific duration group of the class preference group 152 includes '60 minutes,' '90 minutes,' '30 minutes' and '45 minutes,' the user preferred class 172 may include the fitness class that is a Muay Thai class that is taught by a male instructor for 60 minutes at 10a.m.

With continued reference to FIG. 1, memory 112 includes instructions configuring at least a processor 108 to generate a classroom timetable 180. For the purposes of this disclosure, a "classroom timetable" is a schedule planned for a fitness class in a fitness classroom. In some embodiments, the classroom timetable 180 may include months, days, hours, minutes, and the like. As a non-limiting example, the classroom timetable 180 may include January, February, March, April, May, June, July, August, September, October, November, December, and the like. As another non-limiting example, the classroom timetable 180 may include Monday, Tuesday, Wednesday, Thursday, Friday, Saturday, Sunday, and the like. As another non-limiting example, the classroom timetable 180 may include a time slot for 24 hours of a day. For the purposes of this disclosure, a "time slot" is a conventionally defined time interval in a schedule. Persons skilled in the art, upon reviewing the entirety of this disclosure, may appreciate various classroom timetables 180 that may be used for an apparatus 100. In some embodiments, the classroom timetable 180 may be stored in a fitness database 120. In some embodiments, the classroom timetable 180 may be retrieved from the fitness database 120.

With continued reference to FIG. 1, in some embodiments, a classroom timetable 180 may include empty classroom information. For the purposes of this disclosure, "empty classroom information" is information related to an empty classroom from a classroom timetable. For the purposes of this disclosure, an "empty classroom" is a fitness classroom that does not have any fitness classes scheduled. In an embodiment, the empty classroom information may include an available time slot. As a non-limiting example, when the classroom timetable 180 includes fitness classes scheduled for all day except for 2p.m to 4:30 p.m. and 11 p.m. to 2 a.m., the empty classroom information may include the available time slot of the classroom timetable 180 of 2p.m to 4:30 p.m. and 11 p.m. to 2 a.m. In another embodiment, the empty classroom information may include classroom information of an empty classroom. As a non-limiting example, the classroom information of the empty classroom information may include a size of the fitness classroom, temperature range that the fitness classroom can control, fitness classroom lighting, a location of the fitness classroom, accessibility for a disabled user 104, interior design of the fitness classroom, and the like. As another non-limiting example, the classroom information of the empty classroom information may include a format of text, icon, image, video, animation, and the like.

With continued reference to FIG. 1, memory 112 includes instructions configuring at least a processor 108 to generate a classroom timetable 180 for a fitness classroom as a function of a user preferred class 172. As a non-limiting example, when the user preferred class 172 includes a Muay Thai class that is taught by a male instructor for 60 minutes at 10a.m., then the classroom timetable 180 for the fitness classroom at a 10 a.m. time slot may include the Muay Thai class that is taught by the male instructor for 60 minutes. As another non-limiting example, when the user preferred class 172 includes a hot yoga class that is taught by a female instructor for 90 minutes at 6 a.m., then the classroom timetable 180 for the fitness classroom at a 6 a.m. time slot may include the hot yoga class that is taught by the female instructor for 90 minutes.

With continued reference to FIG. 1, a memory 112 includes instructions configuring at least a processor 108 to generate a classroom timetable 180 for a fitness classroom as a function of a user preferred class 172 and a class constraint group 168 of one or more fitness class groups 160. As a non-limiting example, when the user preferred class 172 for the classroom timetable 180 includes a Vinyasa class that is taught by a male instructor for 60 minutes at 11 p.m. and the class constraint group 168 includes a fitness class constraint that the Vinyasa class should be taken at 5 a.m., the Vinyasa class may not be set on the classroom timetable 180. As another non-limiting example, when the user preferred class 172 for the classroom timetable 180 for the fitness classroom in a second floor includes a Muay Thai class that is taught by a male instructor for 60 minutes at 10a.m. and the class constraint group 168 includes a classroom constraint that the Muay Thai class should be taken in a fitness classroom that is on a first floor, the Muay Thai class may not be set on the classroom timetable 180. As another non-limiting example, when the user preferred class 172 includes a cold yoga class that is taught by a female instructor for 90 minutes at 3 p.m. for the classroom timetable 180 that includes a hot yoga class that is scheduled at 2 p.m. for 60 minutes and the class constraint group 168 includes a previous class constraint that if a previous class in the fitness classroom is a hot yoga class, the next class should not be a cold yoga class, the cold yoga class may not be set on the classroom timetable 180. As another non-limiting example, when the user preferred class 172 includes a restorative yoga class that is taught by a male instructor with 10 years of teaching experience for 30 minutes at 3 p.m. using a virtual reality for the classroom timetable 180 that includes a boxing class that is scheduled at 3 p.m. for 20 minutes using the virtual reality and the class constraint group 168 includes an environment constraint that one fitness class should not be a boxing class when another fitness class is a restorative yoga class, the restorative class may not be set on the classroom timetable 180. As another non-limiting example, when the user preferred class 172 includes a Vinyasa class that is taught by a male instructor for 60 minutes at 5 a.m. and a fitness class constraint from the class constraint group 168 that the Vinyasa class should be taken at 5 a.m., the Vinyasa class may be included on the classroom timetable 180 at a 5 a.m. time slot.

With continued reference to FIG. 1, in some embodiments, the classroom timetable 180 may include a personalized timetable. For the purposes of this disclosure, a "personalized timetable" is a fitness classroom schedule that is generated for a specific user. In some embodiments, a memory 112 may include instructions further configuring at least a processor 108 to generate a personalized timetable of a classroom timetable 180 as a function of user information 124 of the user data 116 and class information of class data 136. As a non-limiting example, the personalized timetable May include a restorative yoga class when the user information 124 includes an injury history. As another non-limiting example, the personalized timetable may include a fitness class that includes cardiovascular exercise, such as without limitation a boxing class, Zumba class, kettlebell workout class, and the like when the user information 124 includes a diet goal. As another non-limiting example, the personalized timetable may include a fitness class that does not require advanced fitness experience when the user information 124 includes a fitness experience of a user 104 of beginning level. As another non-limiting example, the personalized timetable may include a fitness class that requires advanced fitness experience when the user information 124 includes the fitness experience of the user 104 of advanced level. Persons skilled in the art, upon reviewing the entirety of this disclosure, may appreciate various types of personalized timetables that may be used as the classroom timetable 180.

With continued reference to FIG. 1, in some embodiments, at least a processor 108 may generate a classroom timetable 180 using a timetable machine learning model 184. For the purposes of this disclosure, a "timetable machine learning model" is a machine learning model that generates a classroom timetable 180. The timetable machine learning model 184 disclosed herein may be consistent with a machine learning model described with respect to FIG. 2. In some embodiments, the timetable machine learning model 184 may be trained with timetable training data 188. For the purposes of this disclosure, "timetable training data" is training data that is used to train a timetable machine learning model. The timetable training data 188 may be consistent with training data described with respect to FIG. 2. In some embodiments, the timetable training data 188 may be received from one or more users, fitness database 120, external computing devices, and/or previous iterations of processing. As a non-limiting example, the timetable training data 188 may include instructions from a user, who may be an expert user, a past user in embodiments disclosed herein, or the like, which may be stored in memory and/or stored in the fitness database 120, where the instructions may include labeling of training examples.

With continued reference to FIG. 1, in some embodiments, a timetable machine learning model 184 may be trained with timetable training data 188 that correlates a user preferred class and a class constraint 144 in a class constraint group 168 of one or more fitness class groups 160 to a classroom timetable 180. As a non-limiting example, the timetable training data 188 may correlate the user preferred class 172 that includes a cold yoga class that is taught by a female instructor for 90 minutes at 3 p.m. for the classroom timetable 180 that includes a hot yoga class that is scheduled at 2 p.m. for 60 minutes and a previous class constraint from the class constraint group 168 that if a previous class in the fitness classroom is a hot yoga class, the next class should not be a cold yoga class to the classroom timetable 180 that does not include the cold yoga class. As another non-limiting example, the timetable training data 188 may correlate the user preferred class 172 that includes a Vinyasa class that is taught by a male instructor for 60 minutes at 11 p.m. and a fitness class constraint from the class constraint group 168 that the Vinyasa class should be taken at 5 a.m. to the classroom timetable 180 that does not include the Vinyasa class. As another non-limiting example, the timetable training data 188 may correlate the user preferred class 172 for the classroom timetable 180 for the fitness classroom in a second floor that includes a Muay Thai class that is taught by a male instructor for 60 minutes at 10a.m. and a classroom constraint from the class constraint group 168 that includes 'a Muay Thai class should be taken in a fitness classroom that is on a first floor' to the classroom timetable 180 that does not include the Muay Thai class. As another non-limiting example, the timetable training data 188 may correlate the user preferred class 172 that includes a restorative yoga class that is taught by a male instructor with 10 years of teaching experience for 30 minutes at 3 p.m. using a virtual reality for the classroom timetable 180 that includes a boxing class that is scheduled at 3 p.m. for 20 minutes using the virtual reality and an environment constraint from the class constraint group 168 that includes 'one fitness class should not be a boxing class when another fitness class is a restorative yoga class' to the classroom timetable 180 that does not include the restorative class. As another non-limiting example, the timetable training data 188 may correlate the user preferred class 172 that includes a Vinyasa class that is taught by a male instructor for 60 minutes at 5 a.m. and a fitness class constraint from the class constraint group 168 that the Vinyasa class should be taken at 5 a.m. to the classroom timetable 180 that includes the Vinyasa class.

With continued reference to FIG. 1, in some embodiments, a timetable machine learning model 184 may be trained with timetable training data 188 that correlates user information 124 to a classroom timetable 180. As a non-limiting example, the timetable training data 188 may correlate the user information of injury history to the classroom timetable 180 that includes a restorative yoga class. As another non-limiting example, the timetable training data 188 may correlate the user information that includes a diet goal to the classroom timetable 180 that includes a fitness class that includes cardiovascular exercise, such as without limitation a boxing class, Zumba class, kettlebell workout class, and the like.

With continued reference to FIG. 1, in some embodiments, at least a processor 108 may generate a classroom timetable 180 using a timetable lookup table. The timetable lookup table disclosed herein may be consistent with a lookup table disclosed above. In some embodiments, the at least a processor 108 may "lookup" in a fitness database 120 using the timetable lookup table to generate a classroom timetable 180. In some embodiments, the timetable lookup table may include any data structure associated with the classroom timetable 180. In some embodiments, the at least a processor 108 may generate the classroom timetable 180 using the timetable lookup table that correlates user preferred class 172 and a class constraint 144 of a class constraint group 168 to the classroom timetable 180. As a non-limiting example, the timetable lookup table may correlate the user preferred class 172 that includes a cold yoga class that is taught by a female instructor for 90 minutes at 3 p.m. for the classroom timetable 180 that includes a hot yoga class that is scheduled at 2 p.m. for 60 minutes and a previous class constraint from the class constraint group 168 that if a previous class in the fitness classroom is a hot yoga class, the next class should not be a cold yoga class to the classroom timetable 180 that does not include the cold yoga class. As another non-limiting example, the timetable lookup table may correlate the user preferred class 172 that includes a Vinyasa class that is taught by a male instructor for 60 minutes at 11 p.m. and a fitness class constraint from the class constraint group 168 that the Vinyasa class should be taken at 5 a.m. to the classroom timetable 180 that does not include the Vinyasa class. As another non-limiting example, the timetable lookup table may correlate the user preferred class 172 for the classroom timetable 180 for the fitness classroom in a second floor that includes a Muay Thai class that is taught by a male instructor for 60 minutes at 10a.m. and a classroom constraint from the class constraint group 168 that includes 'a Muay Thai class should be taken in a fitness classroom that is on a first floor' to the classroom timetable 180 that does not include the Muay Thai class. As another non-limiting example, the timetable lookup table may correlate the user preferred class 172 that includes a restorative yoga class that is taught by a male instructor with 10 years of teaching experience for 30 minutes at 3 p.m. using a virtual reality for the classroom timetable 180 that includes a boxing class that is scheduled at 3 p.m. for 20 minutes using the virtual reality and an environment constraint from the class constraint group 168 that includes 'one fitness class should not be a boxing class when another fitness class is a restorative yoga class' to the classroom timetable 180 that does not include the restorative class. As another non-limiting example, the timetable lookup table may correlate the user preferred class 172 that includes a Vinyasa class that is taught by a male instructor for 60 minutes at 5 a.m. and a fitness class constraint from the class constraint group 168 that the Vinyasa class should be taken at 5 a.m. to the classroom timetable 180 that includes the Vinyasa class.

With continued reference to FIG. 1, in some embodiments, at least a processor 108 may generate a classroom timetable 180 using a timetable lookup table that correlates user information 124 to a classroom timetable 180. As a non-limiting example, the timetable lookup table May correlate the user information of injury history to the classroom timetable 180 that includes a restorative yoga class. As another non-limiting example, the timetable lookup table may correlate the user information that includes a diet goal to the classroom timetable 180 that includes a fitness class that includes cardiovascular exercise, such as without limitation a boxing class, Zumba class, kettlebell workout class, and the like.

With continued reference to FIG. 1, in some embodiments, a memory 112 may include instructions configuring at least a processor 108 to display a classroom timetable 180 on a user device 132. The user device 132 disclosed herein is further described above. In some embodiments, the user device 132 may use a user interface displaying class information 140 of class data 136. For the purposes of this disclosure, a "user interface" is a means by which a user and/or an instructor and a computer system interact; for example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, the user 104 and/or the instructor may interact with user interface in virtual reality. In some embodiments, the user 104 and/or the instructor may interact with the use interface using a computing device distinct from and communicatively connected to a user device 132. In an embodiment, user interface may include a graphical user interface. A "graphical user interface," as used herein, is a graphical form of user interface that allows users and instructors to interact with electronic devices. In some embodiments, GUI may include icons, menus, other visual indicators, or representations (graphics), audio indicators such as primary notation, and display information and related user controls. A menu may contain a list of choices and may allow users 104 to select one from them. A menu bar may be displayed horizontally across the screen such as pull down menu. When any option is clicked in this menu, then the pull down menu may appear. A menu may include a context menu that appears only when the user performs a specific action. An example of this may include pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Using an icon may be a fast way to open documents, run programs etc. because clicking on them yields instant access. Information contained in user interface may be directly influenced using graphical control elements such as widgets. A "widget," as used herein, is a user control element that allows a user and an instructor to control and change the appearance of elements in the user interface. In this context a widget may refer to a generic GUI element such as a check box, button, or scroll bar to an instance of that element, or to a customized collection of such elements used for a specific function or application such as without limitation a dialog box for the users 104 and/or the instructors to customize their computer screen appearances. User interface controls may include software components that a user interacts with through direct manipulation to read or edit information displayed through user interface. Widgets may be used to display lists of similar items, navigate the system using links, tabs, and manipulate data using check boxes, radio boxes, and the like.

With continued reference to FIG. 1, in some embodiments, a memory 112 may include instructions further configuring at least a processor 108 to receive user response data 192 for a displayed classroom timetable 180. For the purposes of this disclosure, "user response data" is data related to any response input from a user. In some embodiments, a user 104 may input user response data 192 through a user interface on a user device 132. As a non-limiting example, the user 104 may touch a touch screen to click an icon on a screen on the user device 132 to input the user response data 192. As another non-limiting example, user 104 may input user response data 192 by clicking an image on a screen of a phone of the user device 132. As another non-limiting example, user 104 may type on a keyboard to input user response data 192 on the user device 132. Persons skilled in the art, upon reviewing the entirety of this disclosure, may appreciate various ways that may be used to input the user response data 192. In some embodiments, the user response data 192 may be stored in a fitness database 120.

In some embodiments, the user response data 192 may be retrieved from the fitness database 120.

With continued reference to FIG. 1, in an embodiment, user response data 192 may include a timetable response. For the purposes of this disclosure, a "timetable response" is a response from a user related to a classroom timetable. As a non-limiting example, the timetable response may include accepting the classroom timetable 180, rejecting the classroom timetable 180, modifying the classroom timetable 180, adding a review related to a fitness class on the classroom timetable, and the like. For example and without limitation, a user 104 may touch a button on a screen of a user device 132 to accept the classroom timetable 180. For another example and without limitation, user 104 may click an icon to reject the classroom timetable 180. For another example and without limitation, user 104 may input a review about the fitness class on the classroom timetable 180 that the user takes on the user device 132. As a non-limiting example, the review may include a format of text, image, video, icon, audio, and the like. As another non-limiting example, the review may include a review score. For the purposes of this disclosure, "review score" is a score that a user inputs on a user device as a timetable response to a fitness class in a classroom timetable that the user took. As a non-limiting example, the review score may include numerical value review, color coding review, star review, emoji review, and the like. For example and without limitation, the user 104 may input the review score with the numerical value review by choosing a number between 0 to 5. For another example and without limitation, user 104 may input the review score with the color coding review by choosing a color between red or green, light grey to dark grey, and the like. For another example and without limitation, user 104 may input the review score with the star review by choosing a number of stars between 0 star to 5 stars. For another example and without limitation, the user 104 may input the review score with the emoji review by choosing an emoji between such as but not limited to thumbs up emoji and thumbs down emoji, smiley emoji and sad emoji, heart emoji and broken heart emoji, and the like. Persons skilled in the art, upon reviewing the entirety of this disclosure, may appreciate various ways that may be used to input the timetable response.

With continued reference to FIG. 1, in another embodiment, user response data 192 may include an empty classroom response. For the purposes of this disclosure, an "empty classroom response" is a response from a user related to an empty classroom information. As a non-limiting example, the empty classroom response may include checking empty classroom information, choosing an empty classroom, booking the empty classroom information, renting the empty classroom, requesting a fitness class for the empty classroom, and the like. For example and without limitation, a user 104 may want to rent an empty classroom for a personal use and may input a request to rent the empty classroom as an empty classroom response by clicking a button on a user device 132. For example and without limitation, user 104 may want to take a class in the empty classroom, then the user 104 may input a request for a fitness class as an empty classroom response by touching an icon on the user device 132. Persons skilled in the art, upon reviewing the entirety of this disclosure, may appreciate various ways that may be used to input the empty classroom response.

With continued reference to FIG. 1, in some embodiments, a memory 112 may include instructions configuring at least a processor 108 to generate a classroom timetable 180 as a function of a user response data 192. In an embodiment, the at least a processor 108 may generate the classroom timetable 180 as a function of a timetable response of the user response data 192. As a non-limiting example, at least a processor 108 may generate the classroom timetable 180 with a fitness class that includes the highest review score. As another non-limiting example, at least a processor 108 may generate the classroom timetable 180 with a fitness class that is accepted from one or more users 104 and without the fitness class that is rejected from the one or more users 104. As another non-limiting example, at least a processor 108 may generate the classroom timetable 180 with a fitness class that is modified by one or more users 104 and/or an instructor.

With continued reference to FIG. 1, in another embodiment, at least a processor 108 may generate a classroom timetable 180 as a function of an empty classroom response of user response data 192. As a non-limiting example, at least a processor 108 may generate the classroom timetable 180 by including a time slot that was an empty classroom before a user 104 rented the empty classroom. As another non-limiting example, the at least the at least a processor 108 may generate the classroom timetable 180 by including a fitness class that the user 104 requested for the empty classroom.

With continued reference to FIG. 1, in some embodiments, a memory 112 may include instructions configuring at least a processor 108 to generate a user code 196 as a function of a user response data 192. In an embodiment, the user code 196 may include a printed form. In another embodiment, the user code 196 may include a digital form. As a non-limiting example, a user 104 may find the user code 196 on a phone screen, tablet, computer screen, or any user device 132 thereof. As a non-limiting example, user 104 may find the user code 196 on a phone screen. For the purposes of this disclosure, a "user code" is an identifier provided to a user that is unique for a fitness class that the user can take among others. As a non-limiting example, the user code 196 may include a universal product code (barcode), radio-frequency identification (RFID,) cryptographic hashes, primary key, a unique sequencing of alpha-numeric symbols, or anything of the like. As another non-limiting example, the user code 196 may include biometric codes such as but not limited to a fingerprint, face scan, retinal scan, and the like. or the purposes of this disclosure, a "universal product code" is a method of representing data in a visual, machine-readable form. In an embodiment, the universal product code may include linear barcode. For the purposes of this disclosure, "linear barcode," also called "one-dimensional barcode" is a barcode that is made up of lines and spaces of various widths or sizes that create specific patterns. In another embodiment, the universal product code may include matrix barcode. For the purposes of this disclosure, "matrix barcode," also called "two-dimensional barcode" is a barcode that is made up of two dimensional ways to represent information. As a non-limiting example, the matrix barcode may include quick response (QR) code, and the like. The user code 196 may take the form of any identifier that uniquely corresponds to the purposes of apparatus 100; this may be accomplished using methods including but not limited to Globally User code 196*s* (GUIDs), Universally User code 196*s* (UUIDs), or by maintaining a data structure, table, or database listing all transmitter identifiers and checking the data structure, table, listing, or database to ensure that a new identifier is not a duplicate.

With continued reference to FIG. 1, in some embodiments, at least a processor 108 may generate a user code 196 when a user 104 accepts a fitness class in a classroom timetable 180 as a timetable response of user response data 192. In some embodiments, the at least a processor 108 may generate the user code when the user 104 rented an empty classroom as an empty classroom response of the user response data 192. In an embodiment, the user code 196 may be used to keep track of the user 104's classroom activity, such as but not limited to how many fitness classes the user 104 took, how many fitness classes the user 104 missed, and the like. In another embodiment, the user code 196 may be used to identify the user 104 from other one or more users 104.

With continued reference to FIG. 1, in some embodiments, a fitness classroom may include an access control device 198. For the purposes of this disclosure, an "access control device" is a device that allows a user to access a fitness class and/or a fitness classroom. In some embodiments, the access control device 198 may be in various location such as but not limited to a door (as shown in FIG. 2), on a wall, on a doorknob, and the like. In some embodiments, the access control device 198 may include a lock. For the purposes of this disclosure, a "lock" is a mechanical or electronic fastening device. As a non-limiting example, the lock may include an electronic lock. For the purposes of this disclosure, an "electronic lock" is a lock which operates by means of electric current. In some embodiments, the access control device 198 may control the electronic lock as a function of a user code 196. Non-limiting examples of the access control device 198 controlling the electronic lock as a function of the user code 196 are disclosed below. In some embodiments, the access control device 198 may include a display screen. As a non-limiting example, the display screen may include a monitor, a touch screen, and the like. The display screen disclosed herein may be consistent with any display device described in the entirety of this disclosure. As a non-limiting example, the display screen of the access control device 198 may display class information 140, classroom information, user information 124, classroom timetable 180, and the like. As another non-limiting example, the display screen of the access control device 198 may display whether a user 104 is whether allowed/or not allowed to enter a classroom, take a fitness class, a door of the fitness classroom is opened or closed, and the like. In some embodiments, the user 104 may modify the classroom timetable 180 using the access control device 198. on a door, on a wall, on a door knob, door handle, and the like. Additional disclosure related to the access control device 198 disclosed herein may be found in applications incorporated by reference herein.

With continued reference to FIG. 1, in some embodiments, one or more users 104 may use a user code 196 to access a fitness class. In some embodiments, an access control device 198 may include a scanning device. For the purposes of this disclosure, a "scanning device" is a device that scans a user code. In some embodiments, the scanning device may include an illumination system, a sensor, and a decoder. The sensor in the scanning device may detect the reflected light from the illumination system and may generate an analog signal that is sent to the decoder. The decoder may interpret that signal, validate the user code 196 using the check digit, and convert it into text. This converted text may be delivered by the scanning device to a computing device holding a database of any information of a fitness class, fitness classroom, classroom timetable 180, and the like. As a non-limiting example, the scanning device may include a pen-type reader, laser scanner, camera-based reader, CCD reader, omni-directional barcode scanner, and the like. In some embodiments, the scanning device may include wired or wireless communication. Persons skilled in the arts, upon reviewing the entirety of this disclosure, may appreciate various scanning devices that may be used in the access control device 198.

With continued reference to FIG. 1, in some embodiments, a memory 112 may include instructions further configuring at least a processor 108 to transmit a classroom timetable 180 to an access control device 198 of a fitness classroom and admit one or more users 104 to the fitness classroom as a function of the classroom timetable 180 using the access control device 198 of the fitness classroom. In some embodiments, the access control device 198 may allow the user 104 to check information of a fitness class, information of a fitness classroom, the classroom timetable 180, and the like. As a non-limiting example, user 104 may check information of general fitness classes, fitness classrooms and the classroom timetable 180. As another non-limiting example, the user 104 may be able to check information of a specific fitness class of the classroom timetable 180, a specific fitness classroom of the classroom timetable 180 that the user 104 may take as the user 104 sign into the user access control device 198 using a user code 196. In some embodiments, the access control device 198 may identify which fitness class the user 104 booked (or confirmed using a user response 192) to take from information obtained from the user code 196 the user 104 used to sign in with the access control device 198. As a non-limiting example, if the fitness class that is on the fitness classroom and the information from the user code 196 of the user 104 corresponds, the access control device 198 may allow the user 104 to get into the fitness classroom by controlling an electronic lock. As another non-limiting example, if the fitness class that is on the fitness classroom and the information from the user code 196 of the user 104 corresponds, the access control device 198 may allow the user 104 to take the fitness class by starting the fitness class in the fitness classroom. As another non-limiting example, if the fitness class that is on the fitness classroom and the information from the user code 196 does not correspond, the access control device 198 may not allow the user 104 to take the fitness class and/or get into the fitness classroom. In some embodiments, the access control device 198 may be used to record the user 104 entering the fitness classroom as the user 104 scans the user code 196 to the access control device 198. As a non-limiting example, the access control device 198 may allow the user 196 to track how many times the user 104 entered into the fitness classroom. As another non-limiting example, the access control device 198 may allow the user 196 to track how many times the user 104 took the fitness classes.

Referring now to FIG. 2, an exemplary embodiment of an entry 200 of a fitness classroom with an access control device 198. In some embodiments, the access control device 198 may be in various location such as but not limited to door 204 (as shown in FIG. 2), on a wall 208 close to door 204, on a door doorknob and the like. The access control device 198 may include various shapes, sizes, and configurations and the access control device 198 illustrated in FIG. 2 is merely a non-limiting example. In some embodiments, the access control device 198 may include a lock 212, display screen 216, scanning device 220, and the like. As a non-limiting example, a user 104 may scan a user code 196 on the scanning device 220 of the access control device 198 on the wall 208 close to the door 204 to take a fitness class of a classroom timetable 180 that the user 104 confirmed using a user device 132. The access control device 198 may check if information from the user code 196 and the classroom timetable 180 matches. If they match, then, the display screen 216 of the access control device 198 may display a name of the fitness class the user 104 is going to take and the lock 212 is opened and the user 104 can open the door 204. The user 104 may open the door 204 using the door knob 210. Additionally, the access control device 198 may record that the user 104 entered the fitness classroom and took the fitness class. As the example above is a non-limiting example, persons skilled in the art, upon reviewing the entirety of this disclosure, may appreciate various circumstances the access control device 198 can be used.

Figures 3A, 3B, 3C:
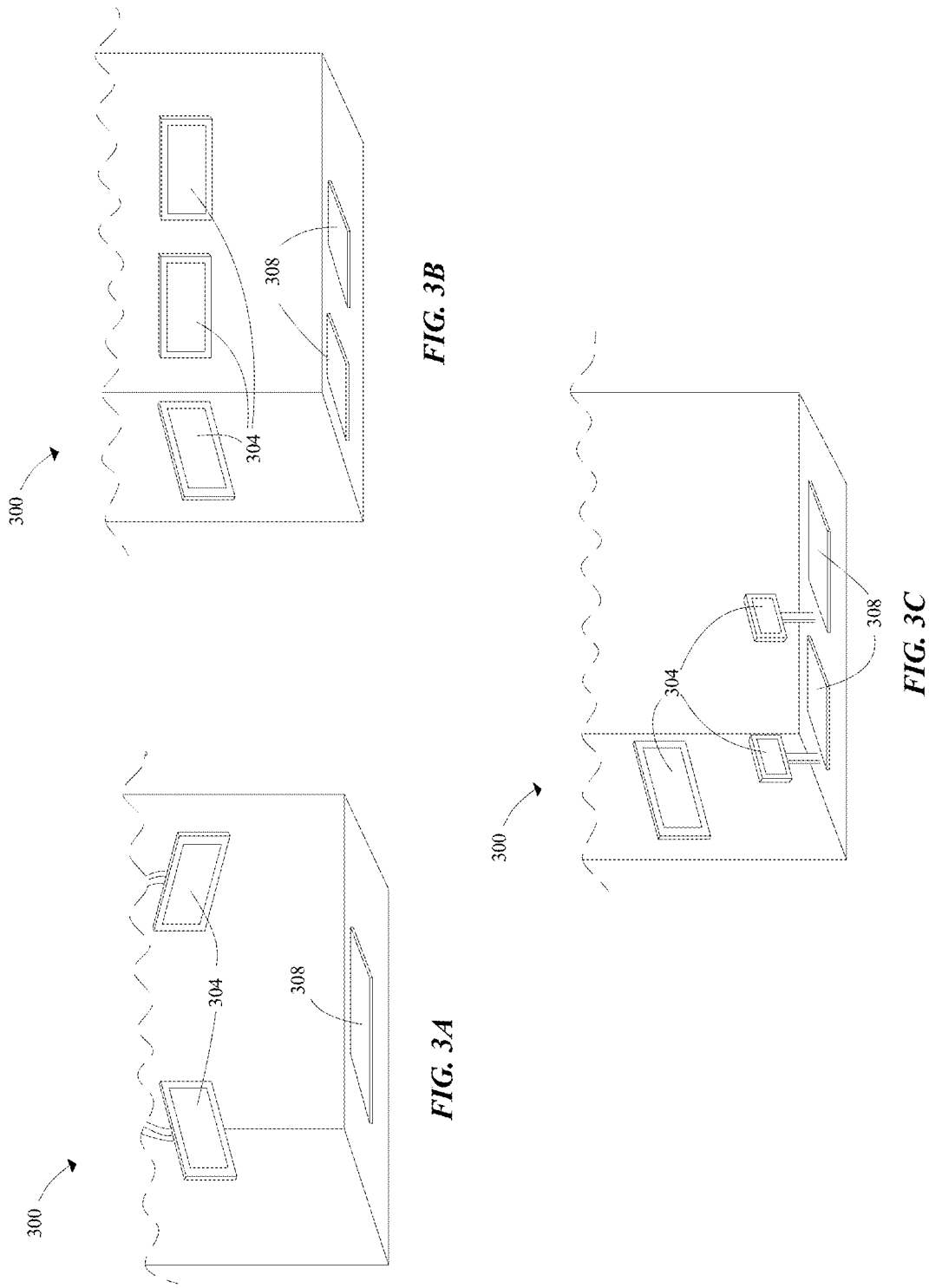
FIG. 3A-C are exemplary embodiments of a fitness classroom.

Referring now to FIG. 3A-C, exemplary embodiments of a fitness classroom 300 are illustrated. In some embodiments, the fitness classroom 300 may include a display 304. For the purposes of this disclosure, a "display" is a device that presents visual information or data. In some embodiments, the display 304 may display a fitness class. As a non-limiting example, the display 304 may display the fitness class in one or more forms of text, graphics, images, video, and the like. In some embodiments, the display 304 may include varying resolutions, sizes, and aspect ratios. In an embodiment, the display 304 may be installed on a surface of ground, wall, ceiling, and the like. In another embodiment, the display 304 may be portable. In some embodiments, the display 304 may include a monitor, phone screen, laptop screen, tablet screen, a smart mirror, a smart watch, a headset screen, a virtual reality screen, an augmented reality screen, and the like. In some embodiments, the display 304 may include different technologies, such as liquid crystal display (LCD,) a light-emitting diode (LED,) organic light-emitting diode (OLED,) plasma, projection, touch screen, and/or the like. In some embodiments, the display 304 may include a plurality of displays 304 . . . . In some embodiments, display 304 may display a fitness class. The plurality of displays 304 may provide different fitness classes to one or more users 104. In some embodiments, the display 304 may include a camera. In some embodiments, the fitness classroom 300 may include user smart (US) equipment. For the purposes of this disclosure, "user smart equipment" is equipment that operates interactively with a user. As a non-limiting example, the user smart equipment may include a smart mat 308, wearable device, and the like. For the purposes of this disclosure, a "smart mat" is an exercise mat that interacts with a person on the mat. In some embodiments, the fitness classroom 300 may include a plurality of the user smart equipment. Additional disclosure related to the fitness classroom 300, display 304, user smart equipment and smart mat 308 may be found in applications incorporated by reference herein.

With continued reference to FIG. 3A, in some embodiments, the display 304 may be on a ceiling of a fitness classroom 300 overhead of a user 104. Display 304 may include a monitor. In some embodiments, the fitness classroom 300 may include a smart mat 308 of a US equipment.

With continued reference to FIG. 3B, in some embodiments, a display 304 may be on a wall of a fitness classroom 300. Display 304 may include a monitor. In some embodiments, the fitness classroom 300 may include a smart mat 308 of a US equipment. In some embodiments, fitness classroom 300 may include a plurality of US equipment including but not limited to the smart mat 308. In some embodiments, when a user 104 signs into the fitness classroom 300 by scanning a user code 196 using an access control device 198, the access control device 198 may assign the user 104 to one of the plurality of US equipment including but not limited to the smart mat 308.

With continued reference to FIG. 3C, in some embodiments, a display 304 may be on a wall of a fitness classroom 300. In some embodiments, display 304 may be on a floor of the fitness classroom 300. Display 304 may include a monitor. In some embodiments, the fitness classroom 300 may include a plurality of displays 304. In some embodiments, the fitness classroom 300 may include a smart mat 308 of a US equipment. In some embodiments, the fitness classroom 300 may include a plurality of US equipment including but not limited to the smart mat 308. In an embodiment, when a user 104 signs into the fitness classroom 300 by scanning a user code 196 using an access control device 198, the access control device 198 may assign the user 104 to one of the plurality of US equipment including but not limited to the smart mat 308. In another embodiment, when the user 104 signs into the fitness classroom 300 by scanning the user code 196 using the access control device 198, the access control device 198 may assign the user 104 to one of the plurality of displays 304.

The access control device 198 may include various shapes, sizes, and configurations.

Figure 4:
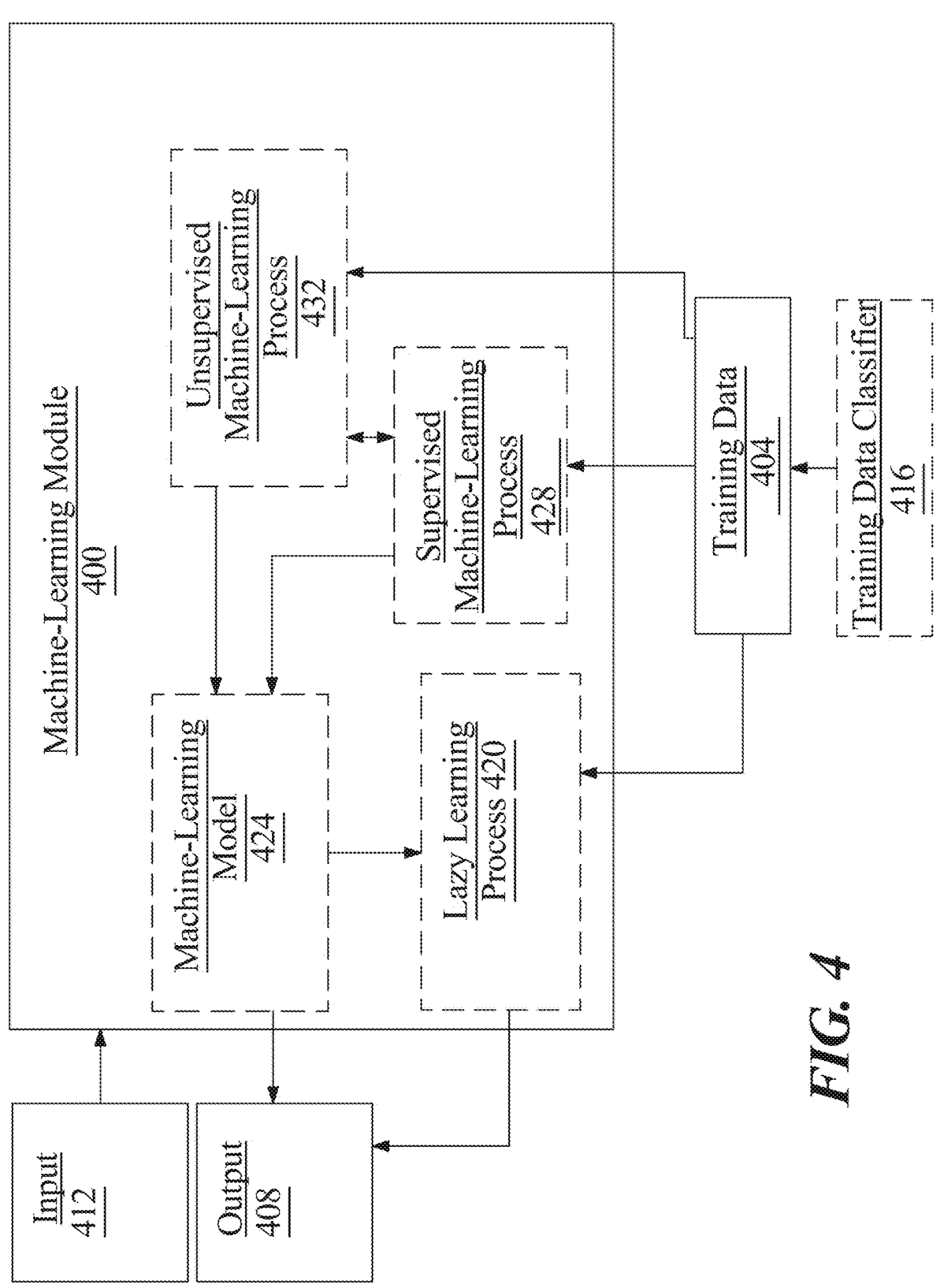
FIG. 4 is a block diagram of exemplary embodiment of a machine learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

With continued reference to FIG. 4, for instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and with continued reference to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs such as entity actions and outputs such as second entities.

With continued reference to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a process whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to second entity types, based on, as non-limiting examples, cost, vehicles, timeframe, availability, and the like.

With continued reference to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include entity actions as described above as inputs, second entities as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With continued reference to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

With continued reference to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 5:
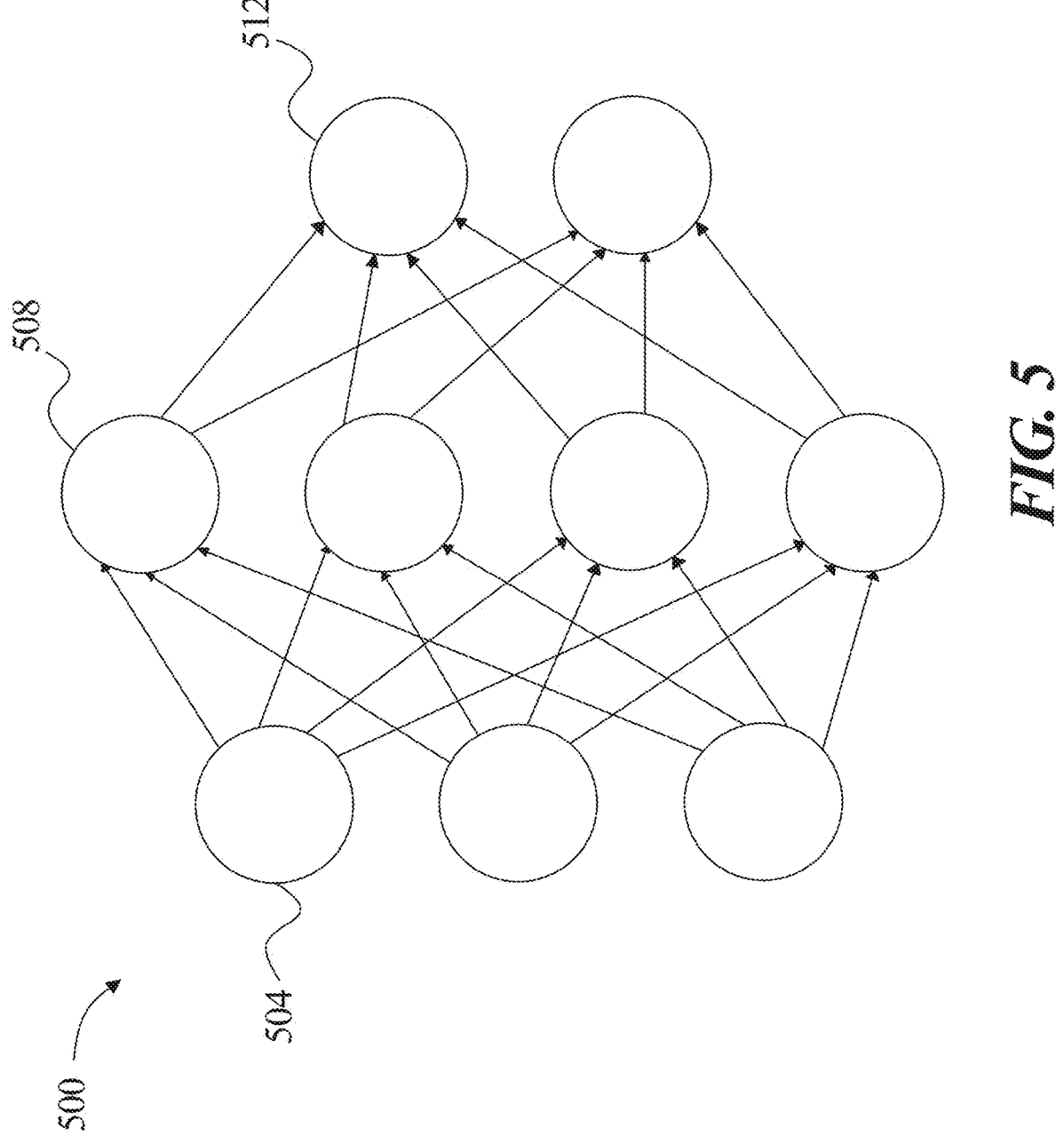
FIG. 5 is a diagram of an exemplary embodiment of a neural network.

Referring now to FIG. 5, an exemplary embodiment of neural network 500 is illustrated. A neural network 500, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
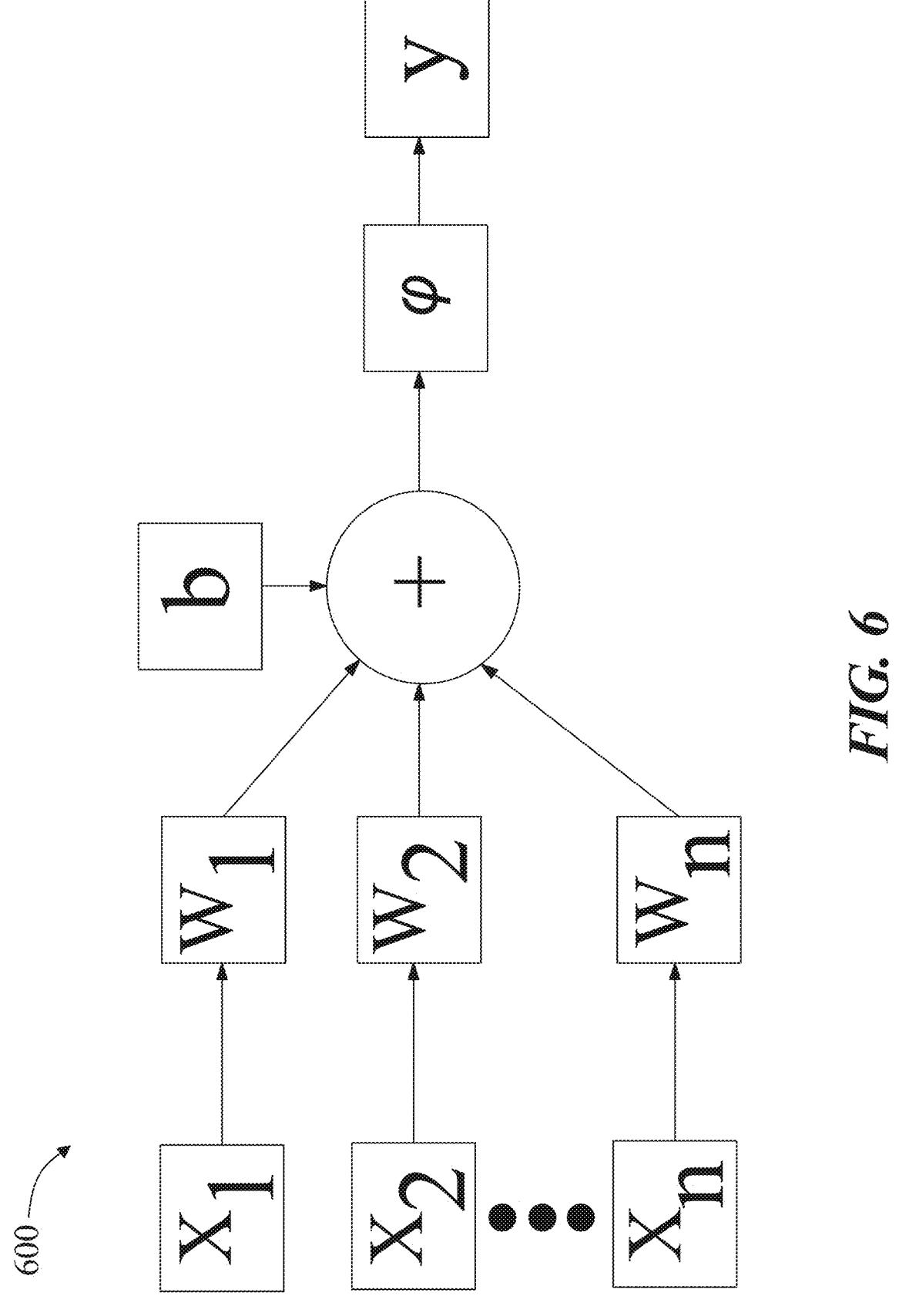
FIG. 6 is a block diagram of an exemplary embodiment of a node.

Referring now to FIG. 6, an exemplary embodiment of a node of a neural network 600 is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Referring now to FIG. 7, a flow diagram of an exemplary method 700 for scheduling for a classroom. Method 700 includes step 705 of receiving, using at least a processor, user data, wherein the user data includes a class preference. In some embodiments, the user data may further include user information data. These may be implemented as disclosed with respect to FIGS. 1-6.

With continued reference to FIG. 7, method 700 includes step 710 of obtaining, using at least a processor, class data, wherein the class data includes class information and a class constraint. In some embodiments, the class constraint may include a previous class constraint. In some embodiments, the class constraint may further include an environment constraint. These may be implemented as disclosed with respect to FIGS. 1-6.

With continued reference to FIG. 7, method 700 includes step 715 of classifying, using at least a processor, user data into one or more user data groups. These may be implemented as disclosed with respect to FIGS. 1-6.

With continued reference to FIG. 7, method 700 includes step 720 of classifying, using at least a processor, the class data into one or more fitness class groups, wherein the one or more fitness class groups includes a class constraint group. These may be implemented as disclosed with respect to FIGS. 1-6.

With continued reference to FIG. 7, method 700 includes step 725 of generating, using at least a processor, a user preferred class as a function of the class preference group of the one or more user data groups. These may be implemented as disclosed with respect to FIGS. 1-6.

With continued reference to FIG. 1, a method 700 includes a step 730 of generating, using at least a processor, a classroom timetable for a fitness classroom as a function of a user preferred class and a class constraint group of one or more fitness class groups. In some embodiments, method 700 may further include generating, using at least a processor, the classroom timetable for the fitness classroom as a function of the user information of the user data and the class information of the class data. In some embodiments, method 700 may further include receiving, using the at least a processor, user response data for the displayed classroom timetable. In some embodiments, the user response data may include an empty classroom response data. In some embodiments, method 700 may further include generating, using at least a processor, the classroom timetable as a function of the user response data. In some embodiments, the classroom timetable may include empty classroom information. In some embodiments, the method 700 may further include transmitting, using the at least a processor, the classroom timetable to an access control device of the fitness classroom and admitting, using the access control device of the fitness classroom, a user to the fitness classroom as a function of the classroom timetable. In some embodiments, method 700 may further include displaying, using at least a processor, the empty classroom information of the classroom timetable on the user device. In some embodiments, method 700 may further include generating, using at least a processor, a user code as a function of the user response data. These may be implemented as disclosed with respect to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
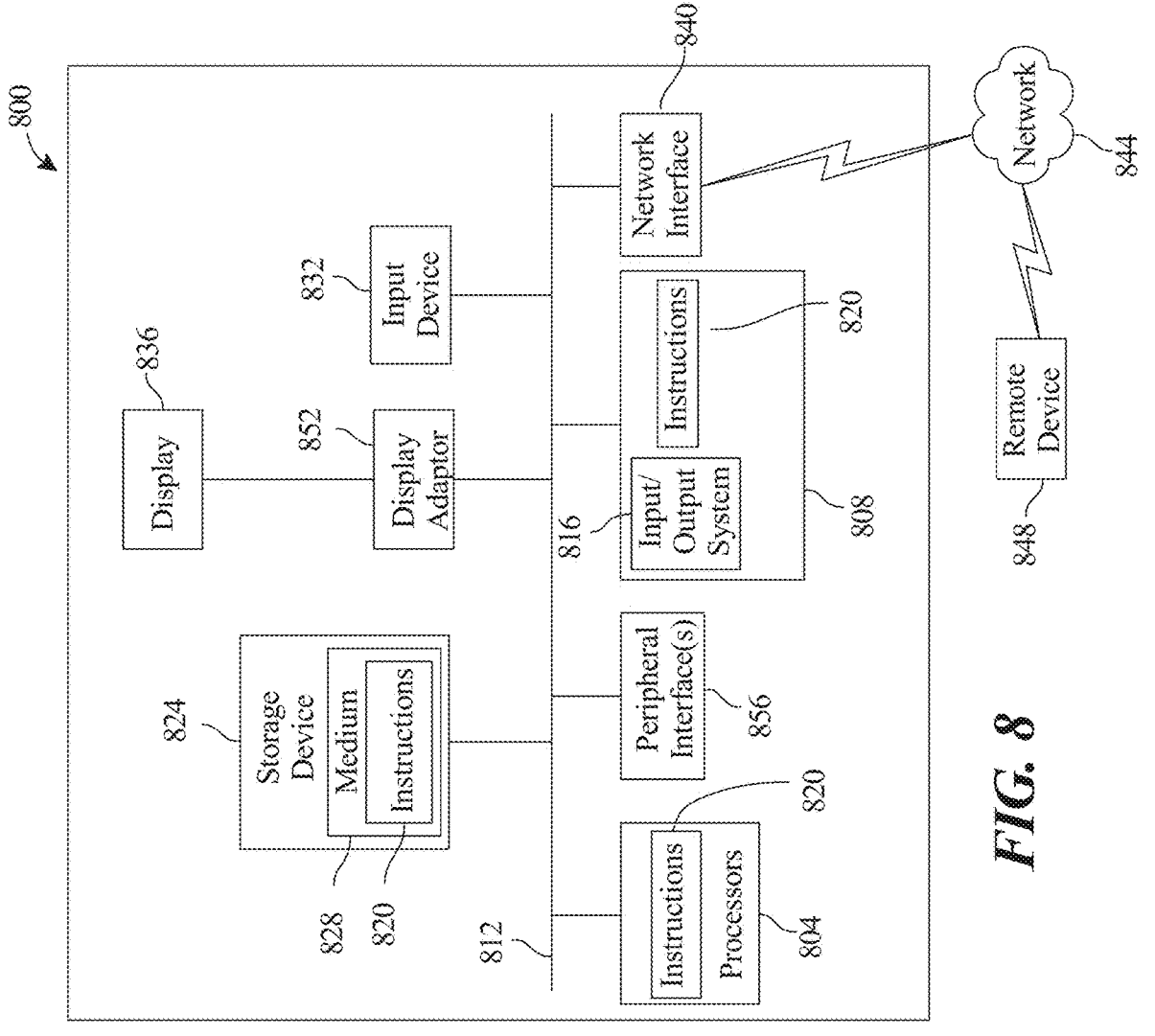
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for classroom scheduling, the apparatus comprising:

at least a processor;

a memory communicatively connected to the at least a processor, wherein the memory contains instructions configuring the at least a processor to:

receive user data, wherein the user data comprises a class preference for a class to take place in a fitness classroom;

obtain class data, wherein the class data comprises class information and a class constraint, wherein the class constraint comprises an environment constraint;

classify the user data into one or more user data groups, wherein the one or more user data groups comprises a class preference group, wherein classifying comprises:

generating group training data using data derived from a fitness database using a training data classifier configured to correlate stored user data to stored user data groups, training a group classifier comprising a machine learning model with the group training data;

outputting, by the group classifier, classified user data;

classify the class data into one or more fitness class groups, wherein the one or more fitness class groups comprises a class constraint group and wherein a fitness class is associated with at least one of: a virtual and an augmented reality fitness class and wherein the fitness class is configured to be accessed using a virtual reality display device;

generate a user preferred class as a function of the class preference group of the one or more user data groups;

generate a classroom timetable for a fitness classroom as a function of the user preferred class and the class constraint group of the one or more fitness class groups, wherein a first fitness class and a second fitness class are operable to be scheduled responsive to the environment constraint such that display of the first fitness class and the second fitness class on associated virtual reality display devices can be controlled; and transmit the classroom timetable to an access control device controlling entry to the fitness classroom, the access control device comprising at least a lock physically attached to an entry point of the classroom and configured to admit access to the entry point based on the timetable.

2. The apparatus of claim 1, wherein:

the user data further comprises user information; and the memory contains the instructions further configuring the at least a processor to generate the classroom timetable for the fitness classroom as a function of the user information of the user data and the class information of the class data.

3. The apparatus of claim 1, wherein the class constraint comprises a previous class constraint.

4. The apparatus of claim 1, wherein the memory contains the instructions further configuring the at least a processor to generate a user interface, wherein the user interface is configured to display the classroom timetable on a user device.

5. The apparatus of claim 4, wherein the memory contains the instructions further configuring the at least a processor to receive user response data for the displayed classroom timetable.

6. The apparatus of claim 5, wherein the memory contains the instructions further configuring the at least a processor to generate the classroom timetable as a function of the user response data.

7. The apparatus of claim 5, wherein:

the classroom timetable comprises empty classroom information; and the memory contains the instructions further configuring the at least a processor to display the empty classroom information of the classroom timetable on the user device.

8. The apparatus of claim 7, wherein the user response data comprises an empty classroom response data.

9. The apparatus of claim 5, wherein the memory contains the instructions further configuring the at least a processor to generate a user code as a function of the user response data.

10. A method for scheduling for a classroom, the method comprising:

receiving, using at least a processor, user data, wherein the user data comprises a class preference for a class to take place in a fitness classroom;

obtaining, using the at least a processor, class data, wherein the class data comprises class information and a class constraint, wherein the class constraint comprises an environment constraint;

classifying, using the at least a processor, the user data into one or more user data groups, wherein classifying comprises:

generating group training data using data derived from a fitness database using a training data classifier configured to correlate stored user data to stored user data groups, training a group classifier comprising a machine learning model with the group training data;

outputting, by the group classifier, classified user data;

classifying, using the at least a processor, the class data into one or more fitness class groups, wherein the one or more fitness class groups comprises a class constraint group and wherein a fitness class is associated with at least one of: a virtual and an augmented reality fitness class and wherein the fitness class is configured to be accessed using a virtual reality display device;

generating, using the at least a processor, a user preferred class as a function of the class preference group of the one or more user data groups;

generating, using the at least a processor, a classroom timetable for a fitness classroom as a function of the user preferred class and the class constraint group of the one or more fitness class groups;

scheduling a first fitness class and a second fitness class in response to the environment constraint;

controlling display of the first fitness class and the second fitness class on associated virtual reality display; and transmitting, using the at least a processor, the classroom timetable to an access control device controlling entry to the fitness classroom, the access control device comprising at least a lock physically attached to an entry point of the classroom and configured to admit access to the entry point based on the timetable.

11. The method of claim 10, wherein the user data further comprises user information data and further comprising:

generating, using the at least a processor, the classroom timetable for the fitness classroom as a function of the user information of the user data and the class information of the class data.

12. The method of claim 10, wherein the class constraint comprises a previous class constraint.

13. The method of claim 10, further comprising:

generating, using the at least a processor, a user interface, wherein the user interface is configured to display the classroom timetable on a user device.

14. The method of claim 13, further comprising:

receiving, using the at least a processor, user response data for the displayed classroom timetable.

15. The method of claim 14, further comprising:

generating, using the at least a processor, the classroom timetable as a function of the user response data.

16. The method of claim 14, wherein the classroom timetable comprises empty classroom information and further comprising:

displaying, using the at least a processor, the empty classroom information of the classroom timetable on the user device.

17. The method of claim 16, wherein the user response data comprises an empty classroom response data.

18. The method of claim 14, further comprising:

generating, using the at least a processor, a user code as a function of the user response data.

\* \* \* \* \*